(12) United States Patent
Pockett et al.

(10) Patent No.: US 11,028,593 B2
(45) Date of Patent: Jun. 8, 2021

(54) SIDE OUTLET DEVICE FOR A BOX GUTTER RAINHEAD

(71) Applicant: Dam Buster IP Pty Ltd c/o Hack Anderson & Thomas Pty Ltd, South Melbourne (AU)

(72) Inventors: David John Pockett, Croydon North (AU); Russell John Kirkwood, Kalorama (AU); Rowan Warwick Gregory, Fitzroy (AU); Richard John Kingston, Beaumaris (AU)

(73) Assignee: DAM BUSTER IP PTY LT, C/O HACK ANDERSON & THOMAS PTY LTD, South Melbourne (AU)

( * ) Notice: Subject to any disclaimer, the term of this patent is extended or adjusted under 35 U.S.C. 154(b) by 0 days.

(21) Appl. No.: 16/862,838

(22) Filed: Apr. 30, 2020

(65) Prior Publication Data
US 2020/0347603 A1 Nov. 5, 2020

(30) Foreign Application Priority Data

Apr. 30, 2019 (AU) .............................. 2019203055
Jun. 20, 2019 (AU) .............................. 2019100671

(51) Int. Cl.
*E04D 13/064* (2006.01)
*E04D 13/08* (2006.01)

(52) U.S. Cl.
CPC ..... *E04D 13/0641* (2013.01); *E04D 13/0645* (2013.01); *E04D 2013/0873* (2013.01); *Y02A 20/00* (2018.01)

(58) Field of Classification Search
CPC ............ E04D 13/0641; E04D 13/0643; E04D 13/0645; E04D 2013/0873
(Continued)

(56) References Cited

U.S. PATENT DOCUMENTS

| 237,469 A | 2/1881 | Bergeman |
| 1,226,712 A * | 5/1917 | Skillman ............... E04D 13/076 52/12 |

(Continued)

FOREIGN PATENT DOCUMENTS

| AU | 2017100991 | 8/2017 |
| AU | 2017100991 A4 * | 8/2017 |

(Continued)

*Primary Examiner* — Ryan D Kwiecinski
(74) *Attorney, Agent, or Firm* — Hanley, Flight & Zimmerman, LLC

(57) ABSTRACT

A side outlet device suitable for use in combination with a rainhead to form an overflow assembly is adapted to enable the rainhead to be mounted external to the building in relation to a wall of the building, to one side of a box guttering extending interiorly along the wall, whereby water flowing from the roof is able to pass through the side outlet device to a downpipe via the overflow device. The side outlet device has a respective end section at first and second opposite ends, with the first end section having a form corresponding to the form of a box gutter end section such that, with the side outlet device mounted in relation to the wall, the first end section extends through the wall and is receivable in the gutter receptor of the overflow device. The second end section is adapted for connection to the box guttering to enable water to flow from the box guttering and through the side outlet device to the overflow device.

8 Claims, 18 Drawing Sheets

(58) Field of Classification Search
USPC ....................................................... 52/11, 16
See application file for complete search history.

(56) References Cited

U.S. PATENT DOCUMENTS

| | | | | |
|---|---|---|---|---|
| 2,121,789 | A * | 6/1938 | Davey | E04D 13/0431 52/250 |
| 3,889,474 | A * | 6/1975 | Frangmeier | E04D 13/068 405/120 |
| 4,028,895 | A * | 6/1977 | Franzmeier | E04D 13/0641 405/120 |
| 4,368,601 | A * | 1/1983 | Price | E04D 13/064 52/12 |
| 4,386,484 | A | 6/1983 | van Berne et al. | |
| 4,726,151 | A | 2/1988 | Vitale | |
| 4,837,987 | A * | 6/1989 | Fender | E04D 13/0645 52/11 |
| 4,951,430 | A * | 8/1990 | Gottlieb | E04D 13/0641 248/48.1 |
| 5,114,594 | A | 5/1992 | Rosebrock et al. | |
| 5,533,303 | A | 7/1996 | Harvey | |
| 5,590,492 | A * | 1/1997 | Cucchiara | E04D 13/064 52/11 |
| 5,678,359 | A * | 10/1997 | Turner | E04D 13/064 52/105 |
| 7,065,924 | B2 * | 6/2006 | Wade | E03F 5/0407 52/16 |
| 7,584,577 | B2 | 9/2009 | Esmond et al. | |
| 7,805,890 | B2 | 10/2010 | Esmond et al. | |
| 8,272,170 | B2 * | 9/2012 | Argentina | E04D 13/0645 52/12 |
| D694,376 | S * | 11/2013 | Knutson | D23/267 |
| 8,910,426 | B2 * | 12/2014 | Peck | E04D 13/08 52/16 |
| 9,038,320 | B1 | 5/2015 | Deakins et al. | |
| 9,732,526 | B2 | 8/2017 | Denk et al. | |
| 9,739,064 | B2 | 8/2017 | Andoh et al. | |
| 10,053,867 | B2 * | 8/2018 | Sinclair | E04D 13/0481 |
| 10,161,134 | B2 * | 12/2018 | Rees | E04D 13/08 |
| 10,428,528 | B1 | 10/2019 | Pockett et al. | |
| 10,450,756 | B2 * | 10/2019 | Owens | E04D 13/064 |
| 10,753,098 | B2 * | 8/2020 | Gregory | E04D 13/0645 |
| 2002/0073630 | A1 | 6/2002 | Warns | |
| 2005/0102927 | A1 * | 5/2005 | Wade | E03F 5/0407 52/160 |
| 2005/0109693 | A1 | 5/2005 | Allard | |
| 2006/0000153 | A1 * | 1/2006 | Banks | E04D 13/0431 52/11 |
| 2010/0193046 | A1 | 8/2010 | Moroder et al. | |
| 2010/0263295 | A1 * | 10/2010 | Flanagan | E04D 13/08 52/1 |
| 2012/0240480 | A1 * | 9/2012 | Hutchings, Jr. | E04D 13/08 52/16 |
| 2013/0111824 | A1 * | 5/2013 | Rees | E04D 13/076 52/12 |
| 2019/0024377 | A1 * | 1/2019 | Gregory | E04D 13/08 |

FOREIGN PATENT DOCUMENTS

| | | | |
|---|---|---|---|
| CN | 203247784 U * | 10/2013 | |
| CN | 205875546 U * | 1/2017 | |
| DE | 9206685 | 8/1992 | |
| FR | 2912162 | 8/2008 | |
| GB | 2490381 | 10/2012 | |
| GB | 2524485 A * | 9/2015 | E04D 13/08 |
| JP | 2004285634 A * | 10/2004 | |
| JP | 2014218813 | 11/2014 | |
| JP | 2015161128 A * | 9/2015 | |
| NL | 1014672 C2 * | 4/2001 | E04D 13/064 |
| NZ | 220081 | 5/1990 | |
| WO | WO-2009052564 A1 * | 4/2009 | E04D 13/0645 |

* cited by examiner

FLOW FEATURES IN REGION OF FREE OVERALL

DEFINITION OF SHARP-CRESTED WEIR PARAMETERS

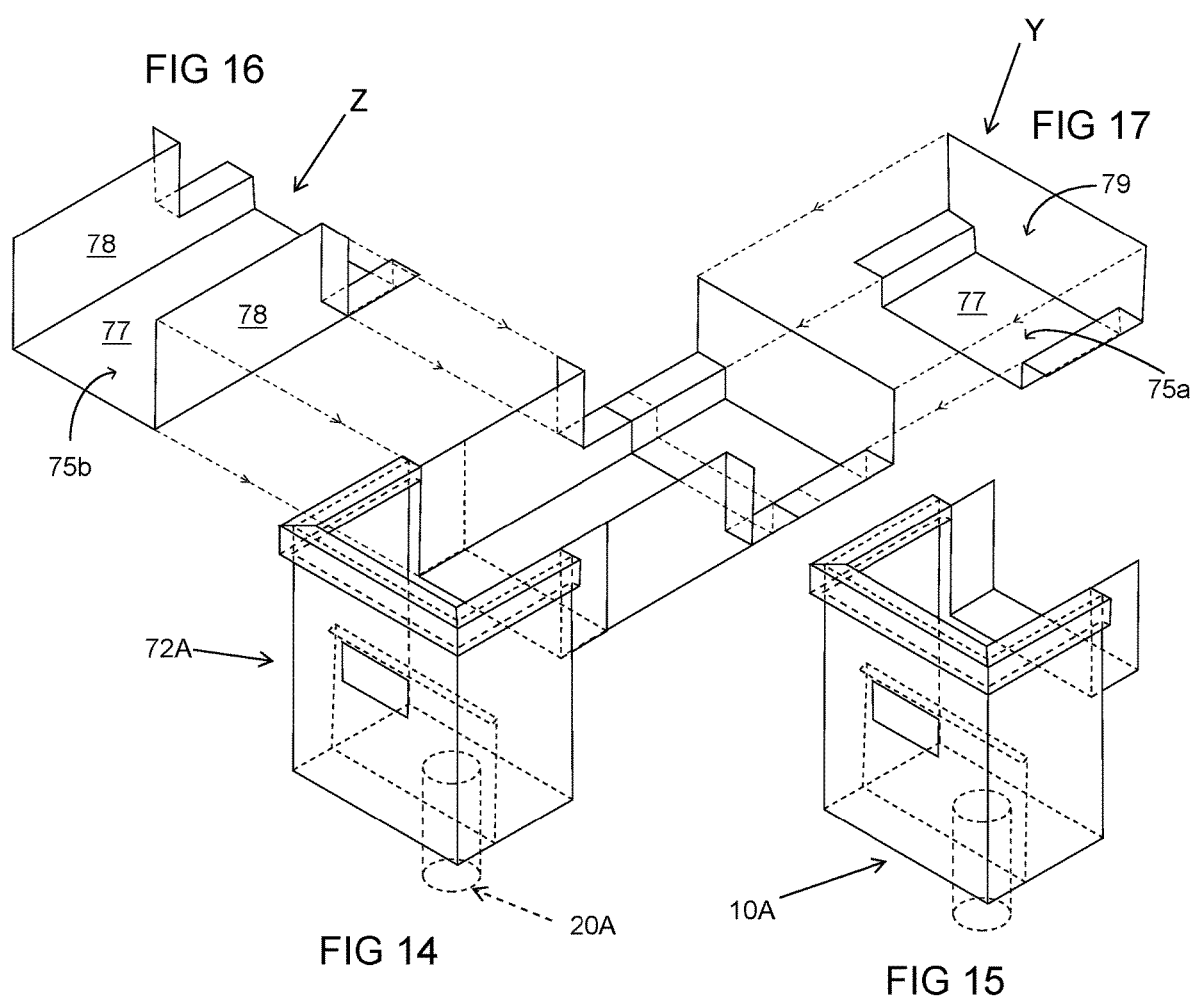

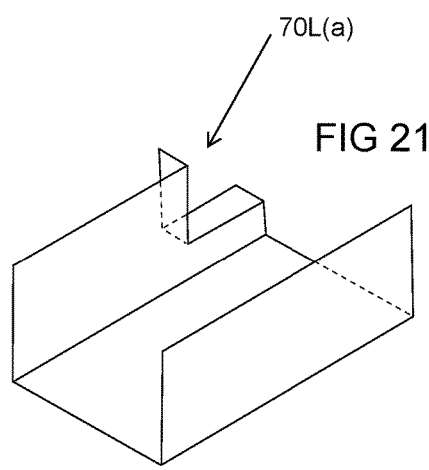
FIG 21
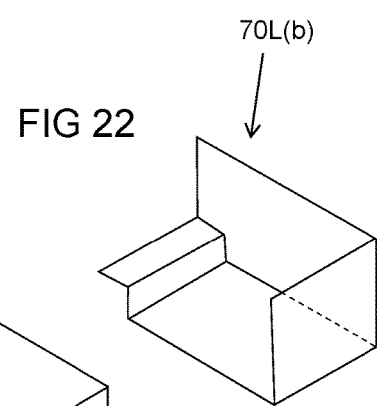
FIG 22
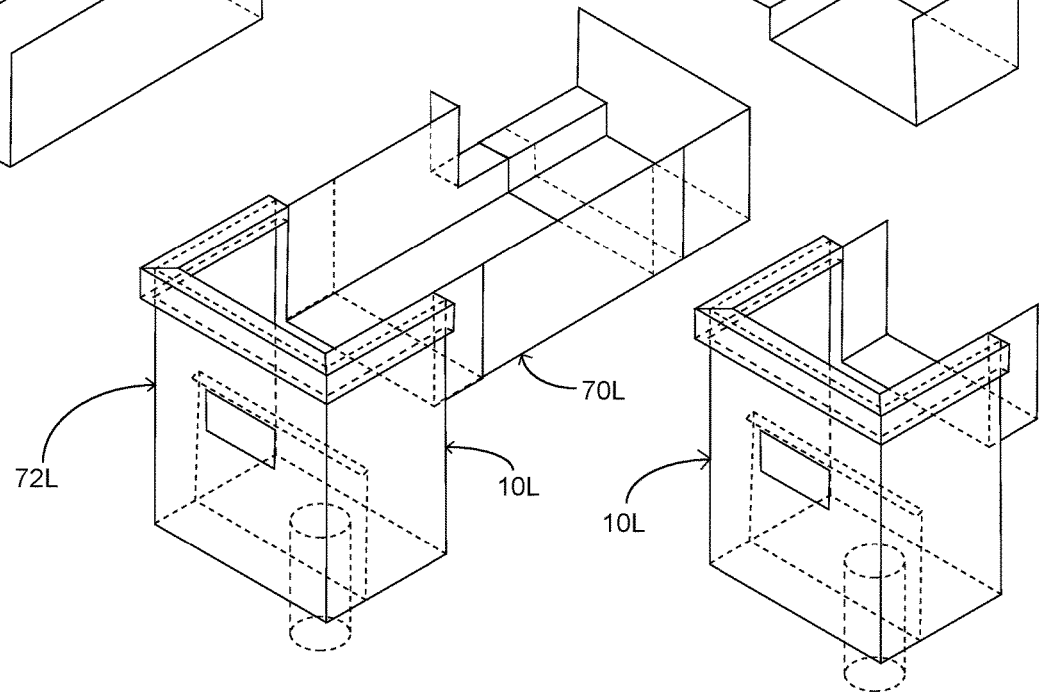
FIG 19
FIG 20

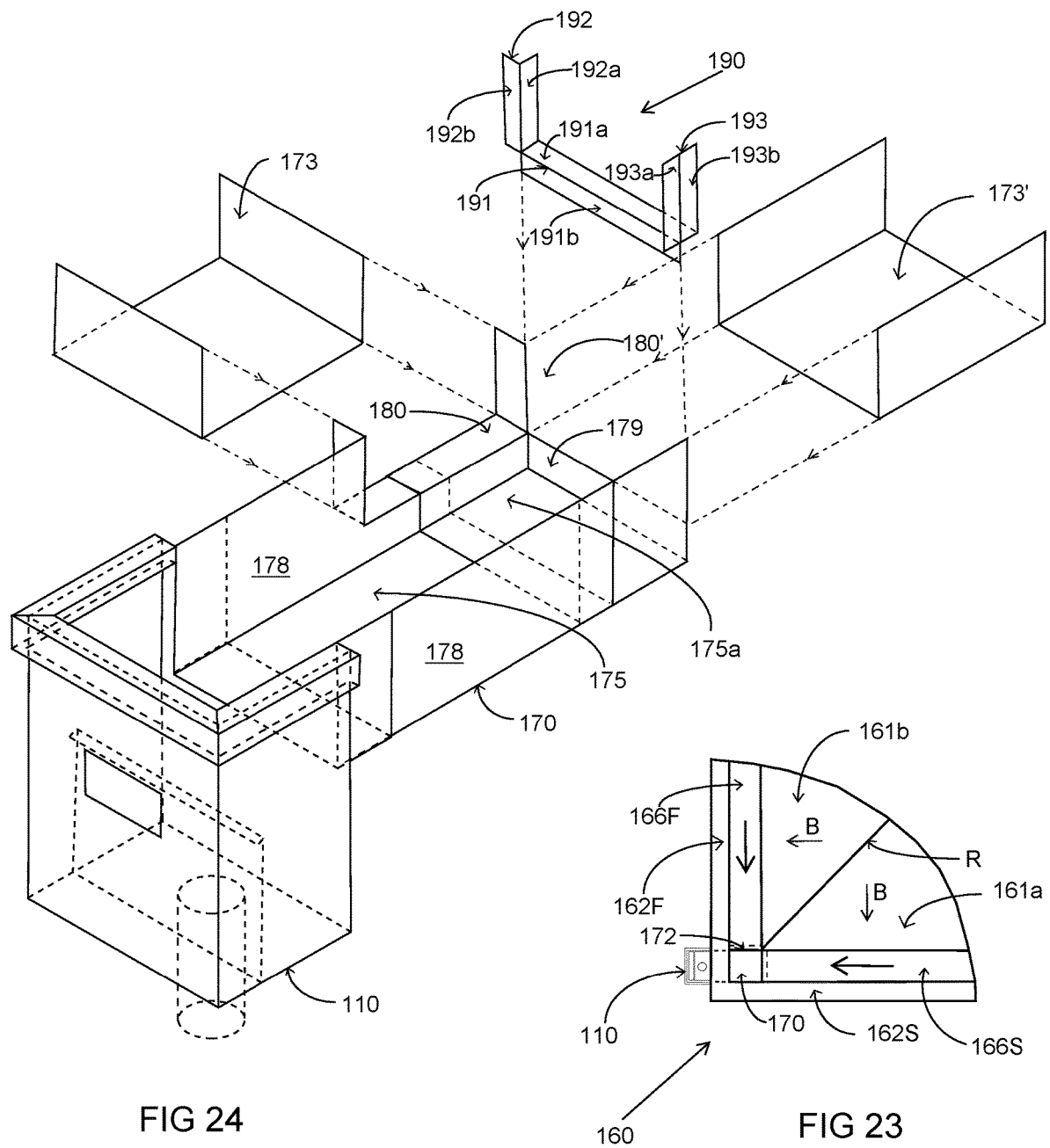

SIDE OUTLET DEVICE FOR A BOX GUTTER RAINHEAD

FIELD OF THE INVENTION

This invention relates to a side outlet device suitable for use with a rainhead overflow device for a box guttering system.

BACKGROUND OF THE INVENTION

The Australasian Standard AS/NZS 3500.3:2015 ('3500.3 Standard') Stormwater drainage code (titled Plumbing and drainage Part 3 Stormwater drainage) specifies and provides a respective illustration of three types of overflow device for box gutters, namely (a) a rainhead, (b) a sump/side overflow device and (c) a sump/high capacity overflow device. That 3500.3 Standard, as well as each subsequent edition specifies, in relation to a type (a) overflow device, that:

Rainhead denotes "A collector of rainwater, generally of rectangular shape, at the end of a box gutter and external to a building, connected to an external downpipe. It has a similar function to a sump."

In contrast, the 3500.3 Standard and subsequent editions specifies, in relation to each of type (b) and (c) overflow device, that:

Sump denotes "A collector of rainwater, generally of rectangular shape, in the sole of a box gutter and connected to a downpipe within the building perimeter. Its function is to increase the head of water at the entry to the downpipe and thus increase the capacity of the downpipe."

When a blockage occurs in a downpipe to which a rainhead is connected, the rainhead is intended to operate without an increase in the depth of water flow in the box gutter, even if operating up to its maximum design hydraulic capacity. Rather, water is required to overflow a wall forming a weir at the front of the rainhead and discharge to atmosphere. In contrast, a blockage that occurs in a downpipe to which a sump, of either type (b) or (c), is connected requires an increase in the depth of flow in the box gutter, up to the maximum design hydraulic capacity of the box gutter, in order for the sump device to allow overflow to occur. Thus, apart from some similarity in function, a rain head is installed and operates in a different manner to a sump.

A sump typically is mounted in the sole of the box gutter, between successive lengths of the gutter, and on roofing within the perimeter of a building. In contrast, a rainhead is typically external to the building, above an external downpipe. Specifically, the rainhead is mounted on an external wall of the building, adjacent to the perimeter of the roofing and at an end of the box gutter.

The present invention is directed to providing a side outlet device suitable for use with a rainhead overflow device for a box guttering system that facilitates the use of a rainhead in an increased range of applications. In combination with a rainhead, this invention provides an alternative to the sump/side overflow device of 3500.3, except that the downpipe is located on the outer face of an external wall of a building, rather than on the inner face.

BROAD DESCRIPTION OF THE INVENTION

According to a first aspect of the present invention, there is provided a side outlet device suitable for use in combination with an overflow device comprising or consisting of a rainhead to form an overflow assembly; wherein the side outlet device is adapted to enable the rainhead to be mounted external to the building in relation to a wall of the building, to one side of a box guttering extending interiorly along the wall, whereby water flowing from the roof is able to pass through the side outlet device to a downpipe via the overflow device; and wherein the side outlet device has a respective end section at first and second opposite ends, with the first end section having a form corresponding to the form of a box gutter end section such that, with the side outlet device mounted in relation to the wall, the first end section extends through the wall and is receivable in the gutter receptor of the overflow device, and with the second end section adapted for connection to the box guttering to enable water to flow from the box guttering and through the side outlet device to the overflow device.

In a first form, the side outlet device has a channel shape in cross-sections between the opposite ends defined by a base and opposed side walls upstanding from the base and joined across the first end by an end wall upstanding from the base, with at least one of the side walls having a region with a reduced height above the base to define an opening in which an end section of a length of box guttering is laterally receivable. In a second form, each of the side walls has a region with a reduced height above the base to define an opening in which an end section of a respective length of box guttering is laterally receivable. In each of the first and second forms the end wall may have a reduced height above the base, between the side walls, to define an opening in which an end section of a length of box guttering is receivable towards the second end.[009] According to a second aspect of the present invention, there is provided an overflow assembly including:

(a) an overflow device comprising or consisting of a rainhead; and
(b) a side outlet device enabling the rainhead to be mounted external to the building in relation to a wall of the building, to one side of a box guttering extending interiorly along the wall, whereby water flowing from the roof is able to pass through the overflow device to a downpipe;
wherein the side outlet device has a respective end section at first and second opposite ends, with the first end section defining a box gutter end section that, with the outlet device mounted in relation to the wall, extends through the wall and is receivable in the gutter receptor of the overflow, and with the second end section adapted for connection to the box guttering to enable water to flow from the box guttering and through the side outlet device to the overflow device.

In each of the first and second aspect of the invention, the overflow device most preferably is an overflow device comprising or consisting of a rainhead, for enabling water from the roof of a building and draining into and along a box gutter to flow into an external downpipe of the building, wherein the overflow device is adapted to be mounted external to the building in relation to a wall of the building, adjacent to a box gutter end, such as a box gutter end section extending through the wall, to enable water flowing from the roof to pass through the overflow device to the downpipe; wherein the overflow device is a rainhead comprising:

a tub member having an inlet at an upper extent of the tub member,
an internal receptacle in the tub member, and
a chute provided in the tub member,
wherein the tub member further includes:
 a lower extent at which the tub member defines both a
  bottom wall at which the receptacle is adapted or adaptable to be connected to a downpipe and a chute outlet;

a side at which the receptacle is adapted to be installed in relation to an external wall of a building, between an end of a box gutter section of guttering and an upper end of a downpipe of the building, whereby water from the box guttering is able to flow into the receptacle through the inlet and discharge through the bottom wall to the downpipe; and a wall that is common to the receptacle and the chute whereby, in the event of a blockage restricting the discharge of water through the bottom wall, water is able to rise in the receptacle to overflow an upper edge of the common wall and to discharge substantially vertically in the chute and to drain through the chute outlet.

In each of the first and second aspects of the invention, the side outlet device can have any of five different forms, depending on the manner in which, relative to a horizontally disposed line extending between the opposite ends of the side outlet device, the second end section of the side outlet device is adapted to receive water from box guttering, at the second end section of the outlet device. In a first form, the side outlet device is adapted to receive of second end section of the side outlet. In second and third forms, the side outlet device is adapted to receive water only from a single box gutter section communicating with one or other of those sides. In fourth and fifth forms, the side outlet device is adapted at the second end section to receive water from each a first box gutter section communicating with one or other of those sides, as well as from a second box gutter section communicating along the horizontally disposed line.

The overflow device of the invention may operate in a similar manner to the prescribed rainhead illustrated in 3500.3 Standard (herein the "prescribed 3500.3 rainhead"). Under normal flow conditions up to the design hydraulic capacity of the box gutter, stormwater is able to discharge into the downpipe to which a rainhead is connected, and from the downpipe to flows unimpeded to an authorised point of discharge for the building via an underground stormwater drainage system. However, the overflow device of the invention differs significantly from the prescribed 3500.3 rainhead in that:

a) The weir formed by the internal wall in the overflow device is concealed by the external wall, such that the weir is internal and not visible;

b) If the downpipe is blocked, or its flow capacity is exceeded, water first overflows the internal, non-visible weir, potentially impacting with the external wall before discharging down to atmosphere through the chute outlet at the bottom of the rainhead. This is in contrast to the prescribed 3500.3 rain head, as the latter causes the water to overflow the outer face of a front wall, comprising an external, visible weir, and thereby discharge to atmosphere; and c) As a consequence of the external wall of the overflow device, water overflowing the weir is redirected so as to have an almost downwards trajectory by the time it reaches then bottom of the overflow chute. In contrast, the prescribed 3500.3 rainhead, the overflowing water has an initially horizontal trajectory that alters increasingly beyond the weir to downwards, due to the force of gravity (that is, it has a trajectory similar to water spilling over a waterfall or spillway). In this regard, the chute defined between the internal wall and the external wall spaced from the internal wall accords substantially with the usual meaning of denoting a channel or passage enabling unimpeded flow, such that the chute outlet most preferably provides no impediment, or at least minimal impediment, to such flow.

In addition to differences a) to c), the overflow device of the invention, at least in preferred forms, enables a secondary overflow provision. The latter provision is by an outlet or opening (typically rectangular, but other shapes, such as circular may be used) that is provided in the external wall and has sufficient capacity to operate as a supplementary overflow facility. However, it is likely to require extreme conditions, of both the downpipe and internal receptacle on the one hand and the weir and chute overflow provision on the other hand to be blocked, before such supplementary facility will be required. The overflow device is preferably proportioned such that the chute has adequate, or more than adequate hydraulic capacity, to discharge the water for the maximum design flowrate in the box gutter and rainhead. However, the overflow device could also be proportioned to have a relatively narrower chute, which would result in the primary overflow having a hydraulic capacity less than the design maximum flowrate, with the deficit in hydraulic capacity of the primary overflow then being provided by the secondary overflow. Most commonly, however, the primary overflow would be designed to have adequate, or more than adequate, hydraulic capacity, and the secondary overflow would not be required hydraulically. However, the secondary overflow could still be installed within the device for aesthetic reasons.

In addition to these differences, the overflow device of the invention is considered to have a significant aesthetic advantage over the prescribed 3500.3 rainhead as the spacing between the internal and external walls that forms the chute effectively hides the end of the box gutter and the weir, other than a small portion that may be visible if an outlet/opening is provided in the external wall to enable a supplementary overflow facility. The overflow device of the invention is considered to be visually preferable device, and hence more likely to be selected by architects, building designers, building owners, developers, plumbers and the like, over a rainhead like the prescribed 3500.3 rainhead.

The overflow device of the invention has a further substantial advantage in facilitating visual inspection from below (typically at ground level), as compared to commonly available rainheads. A check of whether the primary overflow outlet is blocked or clear can be conducted quickly and easily by an untrained person. As long as the primary overflow remains visually clear, the overflow device of the invention will continue to operate as intended in protecting the building from internal flooding. This is unlike previously proposed rainheads that requires access to the rainhead itself, or above it, for inspection purposes. Thus, the invention has substantial Occupational Health and Safety benefits in association with routine maintenance and inspections.

A downpipe is able to drain water from the internal receptacle by engagement of the upper end of the downpipe with the outlet provided in the base wall of the tub. The outlet preferably is preformed and of a size suited for engagement with a downpipe of a standard size. However, the outlet may be formed on site to suit a previously installed downpipe where there is a need to allow an installer the option of cutting an outlet hole to fit a particular size or location of downpipe.

The top of the internal wall most preferably is lower than the bottom of the inlet. The top of the internal wall also may be lower than an upper edge of each of opposite sides of the overflow device that extend from the mounting wall to the external wall, and also lower than an upper edge of the external wall. An upper edge of the internal wall that enables it to form or function as a weir may be sharply edged or rounded. The secondary overflow outlet, if provided, may have a bottom edge that is lower than the top of the internal wall, such as by about 25 mm or more.

Assuming that there is no blockage, the internal receptacle during normal flow conditions up to the design flow rate should be large enough to receive all water flowing through the inlet from a box gutter without the receptacle overflowing.

When the overflow device is used in conjunction with the side outlet device, the resultant overflow assembly enables use of the overflow device essentially in the usual manner, by the side outlet device adapting flow laterally with respect to box guttering. For this, the second end section may be adapted for connection to the box guttering at one or other of opposite sides of the second end section that are spaced laterally with respect to the spacing between the first and second ends of the outlet device. Thus, as viewed from the first end, the outlet device may have a left hand form or a right hand form, for receiving water from a box guttering extending laterally to the second end section of the outlet device from the left or from the right, respectively. However, the side outlet device may have a third form able to receive water from respective box gutterings, one guttering extending laterally to the second end section of the outlet device from the left and the other guttering extending similarly from the right. Also, as detailed earlier herein other arrangements are possible.

In order that the invention may more readily be understood, description now is directed to the various embodiments of the invention illustrated in the accompanying drawings.

BRIEF DESCRIPTION OF THE DRAWINGS

FIG. 14 is a perspective view of the assembly of FIG. 13;

FIGS. 15, 16 and 17 each provide a perspective view of respective components of the assembly of FIG. 14;

FIG. 19 is a perspective view of the assembly of FIG. 18;

FIGS. 20, 21 and 22 each provide a perspective view of respective components of the assembly of FIG. 18;

FIG. 23 is a plan view from above of part of the roof of another building illustrating the installation of an overflow device according to the first aspect of the invention in relation to a fourth side outlet device according to the second aspect of the invention to form a further overflow assembly according to the third aspect of the invention;

FIG. 24 is an exploded perspective view of the arrangement of FIG. 23;

DETAILED DESCRIPTION OF THE DRAWINGS

Figure 1:
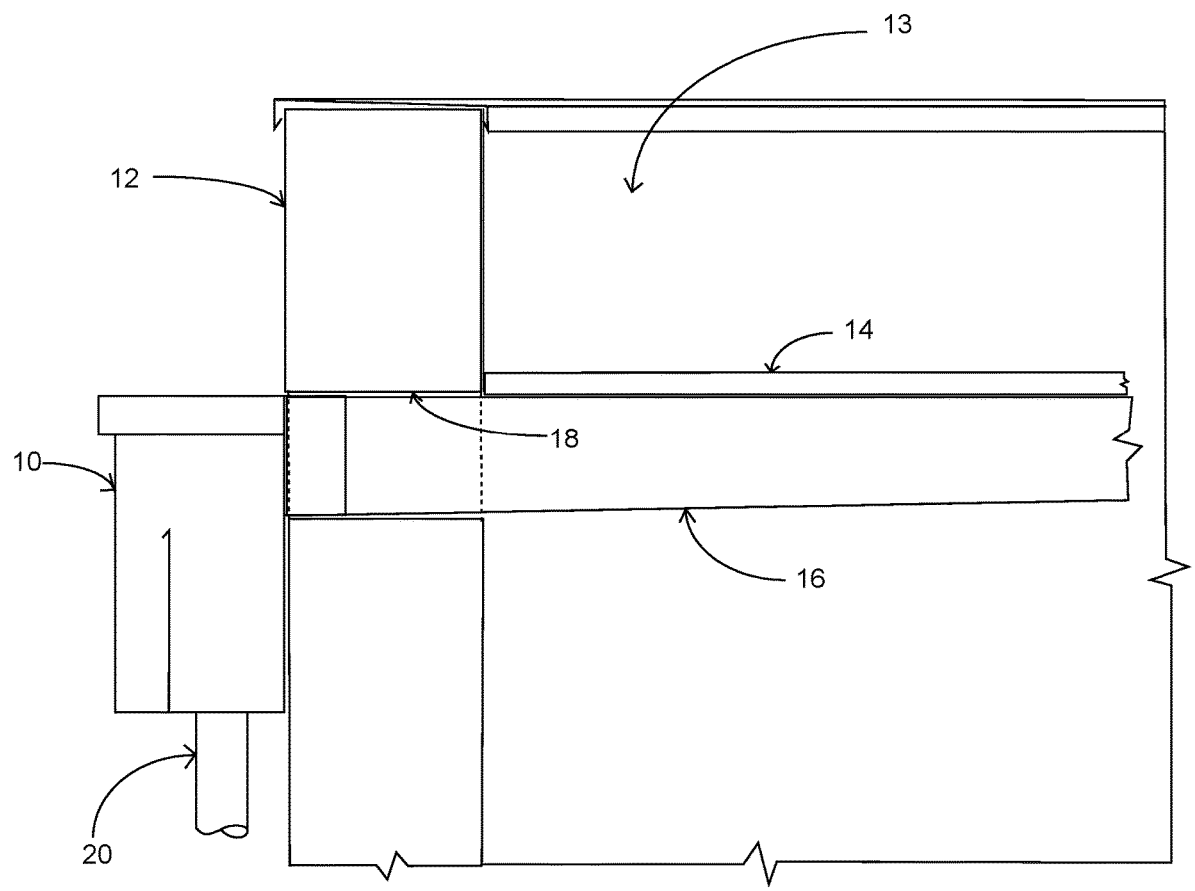
FIG. 1 is a sectional view of part of a building showing an overflow device according to the first aspect of the invention in a usual relationship to a box gutter, with the arrangement shown apart from the full drainage system of roofing of the building for which system the box gutter comprises a part.
Figure 2:
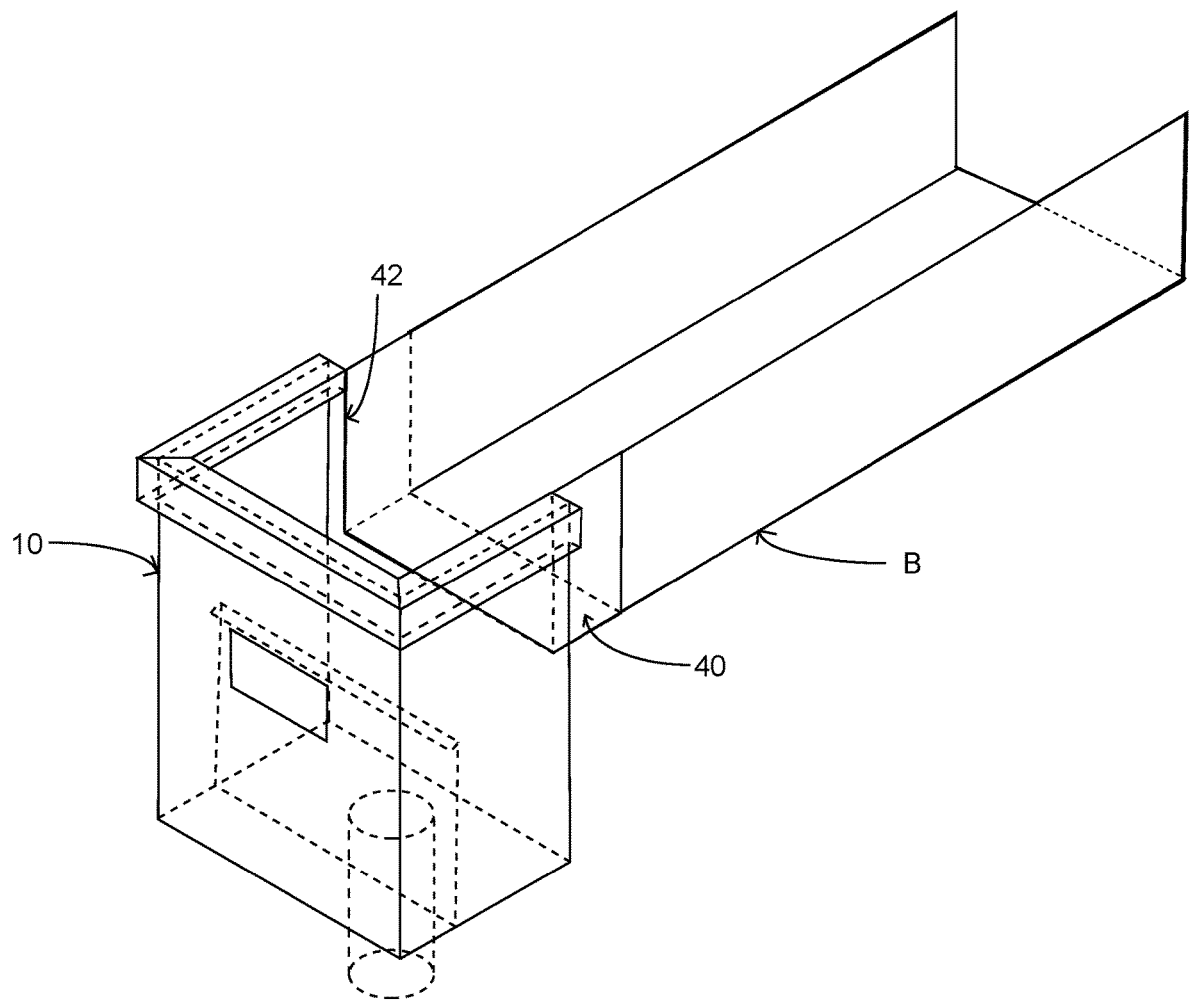
FIG. 2 is a perspective view of the overflow device and box gutter of the arrangement of FIG. 1.
Figure 3:
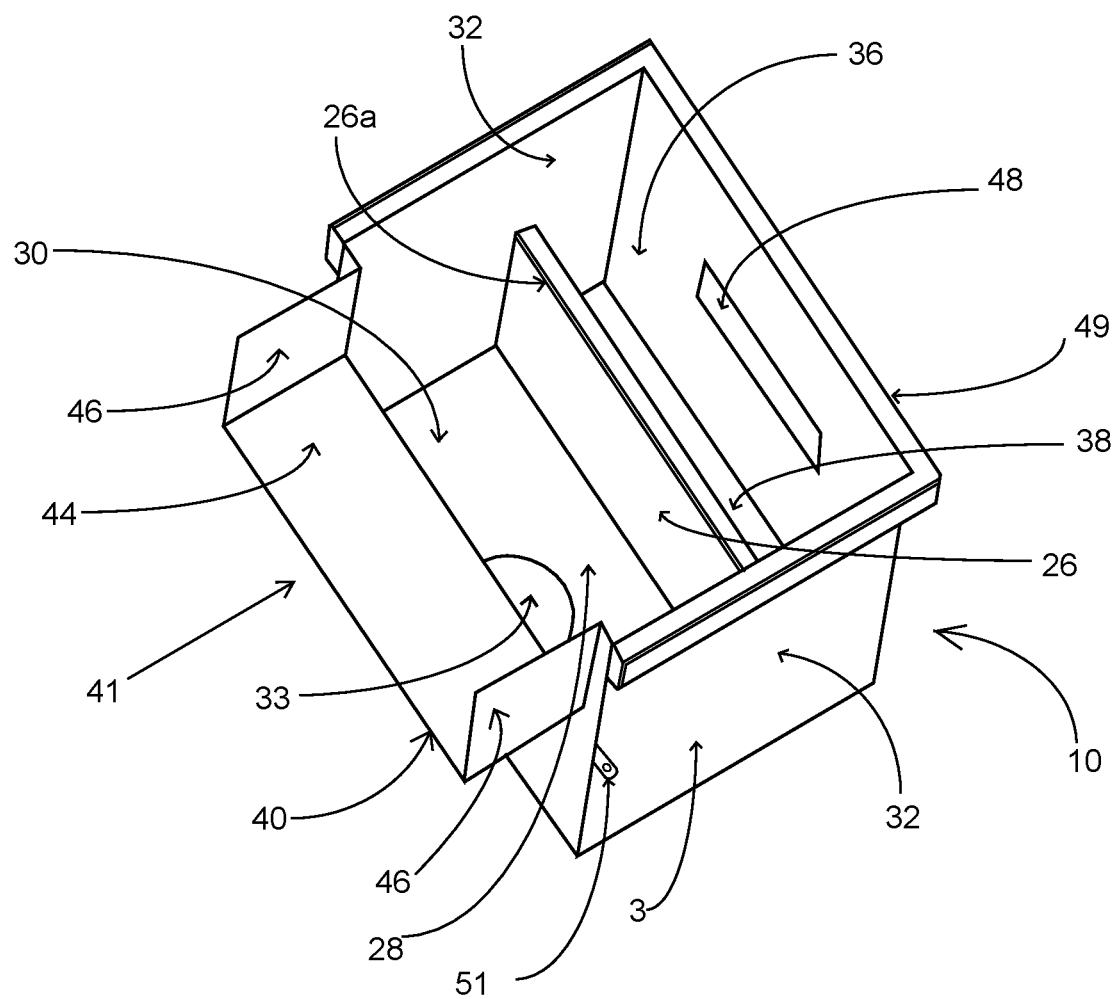
FIG. 3 is an isometric view from above of the general form of an overflow device similar to that of FIG. 1.
Figure 4:
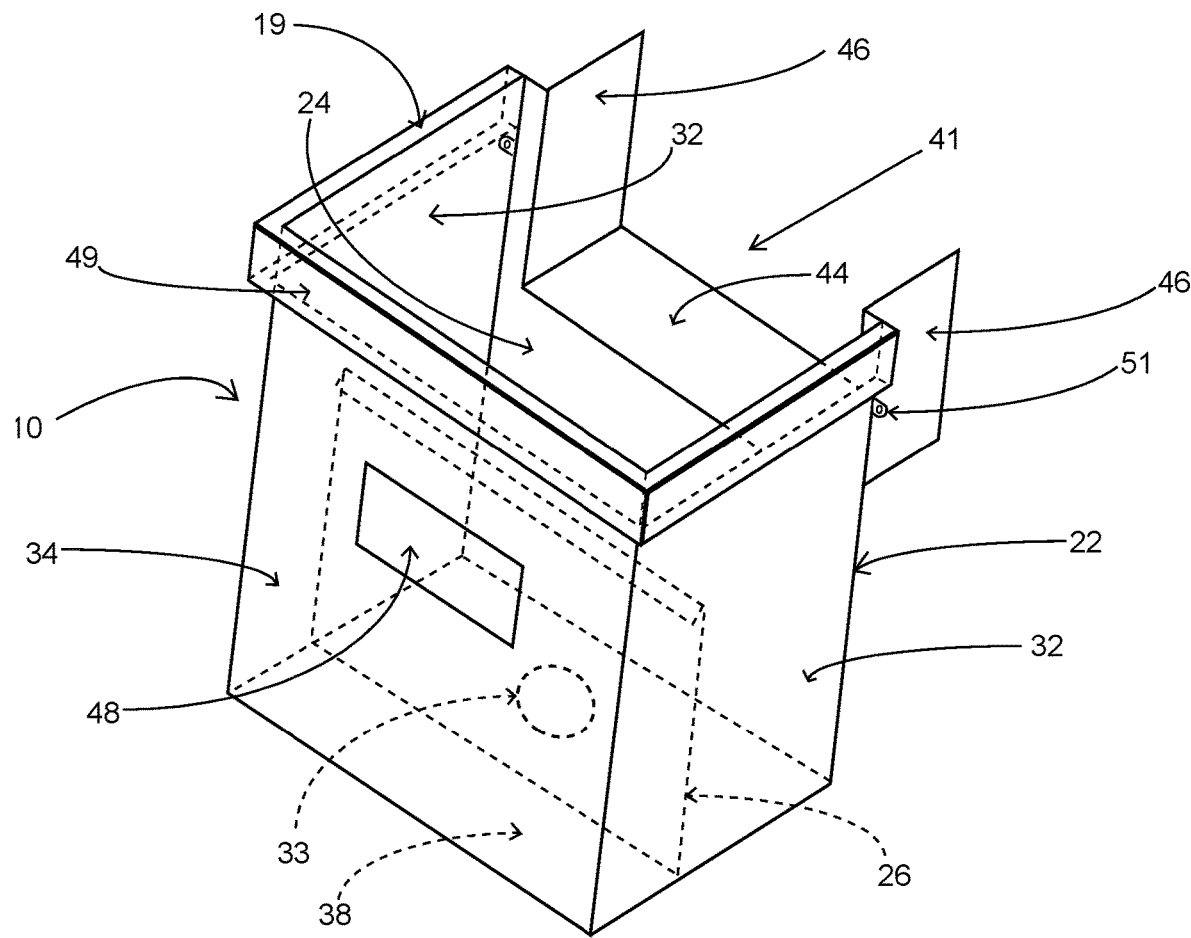
FIG. 4 is an isometric view of the overflow device of FIG. 3 taken from one side.

With reference to FIGS. 1 to 6, there is shown an overflow device 10, comprising or consisting of a rainhead, according to a first aspect of the present invention. In FIG. 1, the device 10 is shown as installed in relation to a building represented only by a section through a parapet wall 12, an adjacent wall 13 and part of the structure of roofing 14, for enabling water from the roofing to drain along a box gutter 16 on the roofing 14. In the arrangement of FIG. 1, the device 10 is mounted externally of the building on wall 12, adjacent to a corner of the building defined by walls 12 and 13, with the gutter 16 extending along the wall 13. As seen in FIG. 1, the device 10 is mounted on wall 12 adjacent to an end of the box gutter 16 that extends through a purpose-cut opening 18 through wall 12. The arrangement enables water to flow from the gutter 16 into an external downpipe 20 of the building, via the overflow device 10.

The overflow device 10 comprises a tub 22 that includes a rear mounting wall 24, an internal wall 26 and a base portion 28. The arrangement is such that the tub 22 defines an internal receptacle 30 above the base portion 28, between mounting wall 24 and internal wall 26 and also between sidewalls 32 each of which extends between a respective edge of walls 24 and 26. The internal wall 28 forms a weir and the arrangement is such that water accumulating in receptacle 30 is able to overflow the upper edge of wall 26 when the hydraulic capacity of the receptacle 30 and downpipe 20 is exceeded, or when either the receptacle 30 or downpipe 20 is blocked, or partially blocked (thereby reducing their hydraulic capacity). However, the base portion 28 defines an outlet 33 adapted for engagement with the upper end of downpipe 20 for the intended purpose on water draining from receptacle 30 through the downpipe 20 rather than overflowing the weir provided by wall 26.

The overflow device 10 further includes a front, or external wall 34 spaced forwardly from the internal wall 26 and joining across extensions of the sidewalls 32. The arrangement is such that a chute 36 is defined between walls 26 and 34 and between sidewalls 32, with the chute 36 having a chute outlet 38 defined by the internal wall 26, the external wall 34 and the sidewalls 32. Thus, in the event that water does overflow the weir provided by wall 26, the water is able to discharge substantially unimpeded under gravity, through the chute 36 and the chute opening 38.

The upper extent of mounting wall 24 is shaped to define, or is provided with, a gutter receptor 40 that forms an inlet 41 to the receptacle 30. As shown, the gutter receptor 40 forms a rectangular opening 42 in the upper extent of the mounting wall 24 with a horizontally extending flange 44 projecting from the lower edge of the opening 42, away from the internal wall 26, with a respective upright flange 46 extending similarly away from each side of the opening 42. The arrangement is such that the opening 42 and flanges 44 and 46 define the inlet 41 and receptor 40 is adapted to receive the end of the box gutter 16 to enable water flowing from the end of the gutter 16 to discharge into the receptacle and then through the outlet 33 of base portion 28 and into downpipe 20.

The internal wall 26 has an upper edge that defines a weir 26a. The height of wall 26 is less than that of the external wall 34 and the sidewalls 32, and preferably not more than the height of the flange 44 that extends from the lower edge of opening 42 in the mounting wall 24.

The overflow device 10 is adapted to be mounted externally of the building, with rear wall 24 of the device 10 located against the building wall 12. The device 10 is mounted at a location at which the device 10 is adjacent to an end section of the box gutter 16 that projects outwardly with respect to the roofing 14, into an opening 12a formed through the wall 12. At that location mounting wall 24 of the device is adjacent or against the wall 12 of the building with the flanges 44 and 46 received inwardly into the opening 12a. The arrangement is such that, within the opening 12a, the end section of gutter 16 is engaged received in the gutter receptor 40, with the receptor preferably shaped so that the channel shape of the gutter 16 is neat in the receptor 40 (apart from a small gap allowed for the installation of a silicone sealant), whereby, with the overflow device 10 so mounted, water is able to flow from the roof of the building to drain along the box gutter 16 to flow from the end of gutter, through the inlet 41 and into the receptacle 30. Thus, the water is able to discharge through the outlet 33 defined by the base portion 28, into the downpipe 20, if the receptacle 30 and the downpipe 20 are unblocked. However, if one or each of the receptacle 30 and the downpipe 20 is blocked, or partially blocked, or if, during an extreme rainfall event (i.e. having an intensity greater than the maximum design rainfall intensity), the hydraulic capacity of receptacle 30 and downpipe 20 are exceeded, or if the hydraulic capacity of the storm water drainage system downstream of the rainhead and downpipe is exceeded, water is able to fill receptacle 30 so as to overflow the weir 26a, to discharge through the chute 36 to overflow outside the building.

As indicated, the chute 36 is defined between walls 26 and 34 and between sidewalls 32, with the chute outlet 38 defined by the internal wall 26, the external wall 34 and the sidewalls 32. The chute 36 is disposed upright, when the device is mounted as described, so that water is able to discharge through the outlet 38, in the event that water does overflow the weir provided by wall 26a, by the water passing through the chute 36 and the chute outlet 38 by substantially by unimpeded free-fall under gravity. Preferably the lower edge of at least the internal wall 26 is below the underside of base portion 28 so that the tendency for water to flow around the lower edge of wall 26 does not enable water to pass across the underside of portion 28 towards wall 12. This arrangement provides a 'drip edge', and its purpose is to prevent the flow of water laterally along a horizontal external surface to a vertical external surface, down which the flow or water can result in (unwanted) staining and/or water damage.

As a precaution, should flow through both the internal receptacle 30 and the chute outlet 38 become blocked, such as by leaves or twigs or foreign objects, an overflow outlet 48 may be formed in the external wall 34. The overflow outlet 48 may be provided at a level at which its bottom edge is below the level of the weir defined by the internal wall 26, but above the calculated impact point of the free overflow from the internal wall 7 forming a weir. A more detailed explanation of the secondary overflow outlet 34 in the external wall 34 is provided earlier herein, prior to reference to the accompanying drawings.

Figure 5:
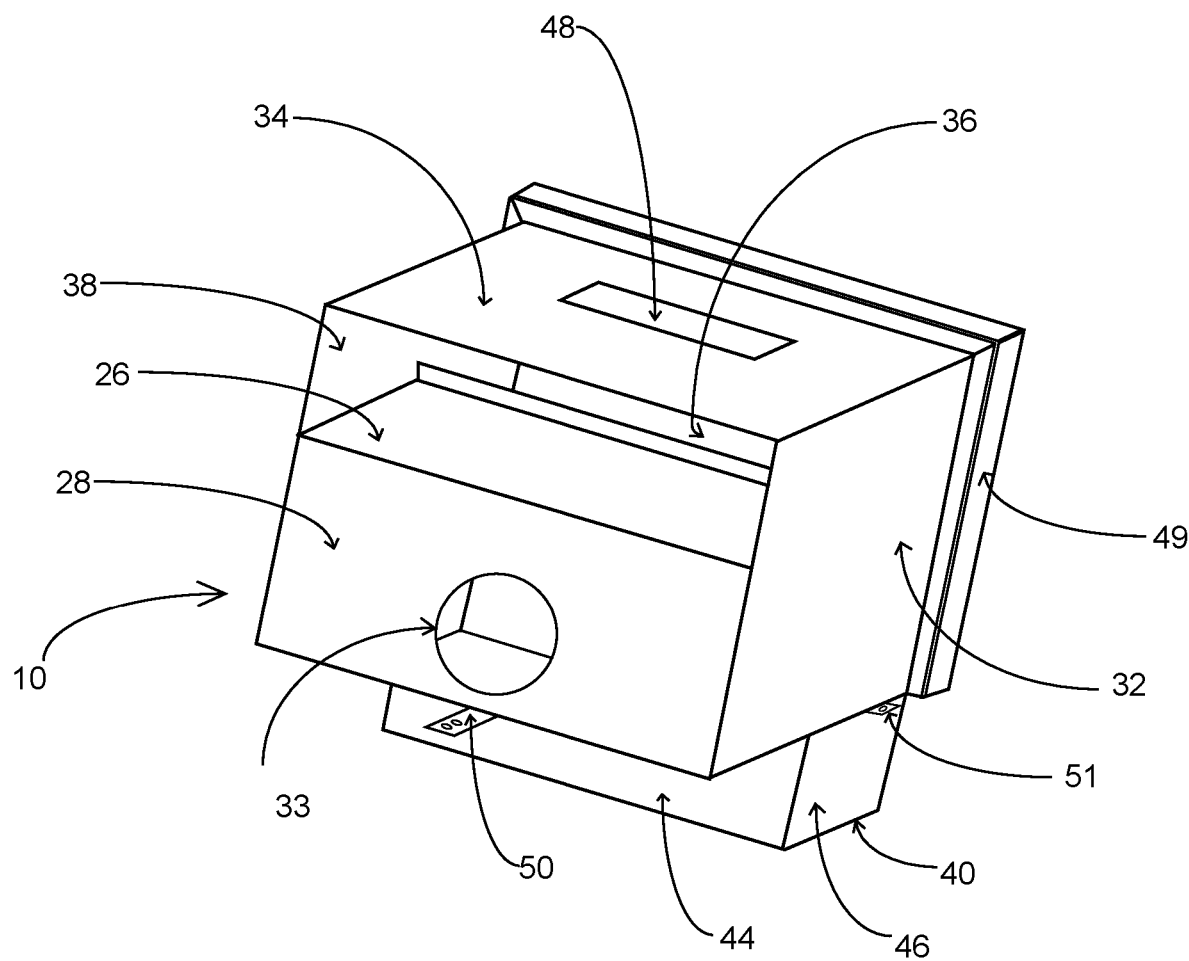
FIG. 5 is an isometric view of the overflow device of FIG. 3 from below.
Figure 6:
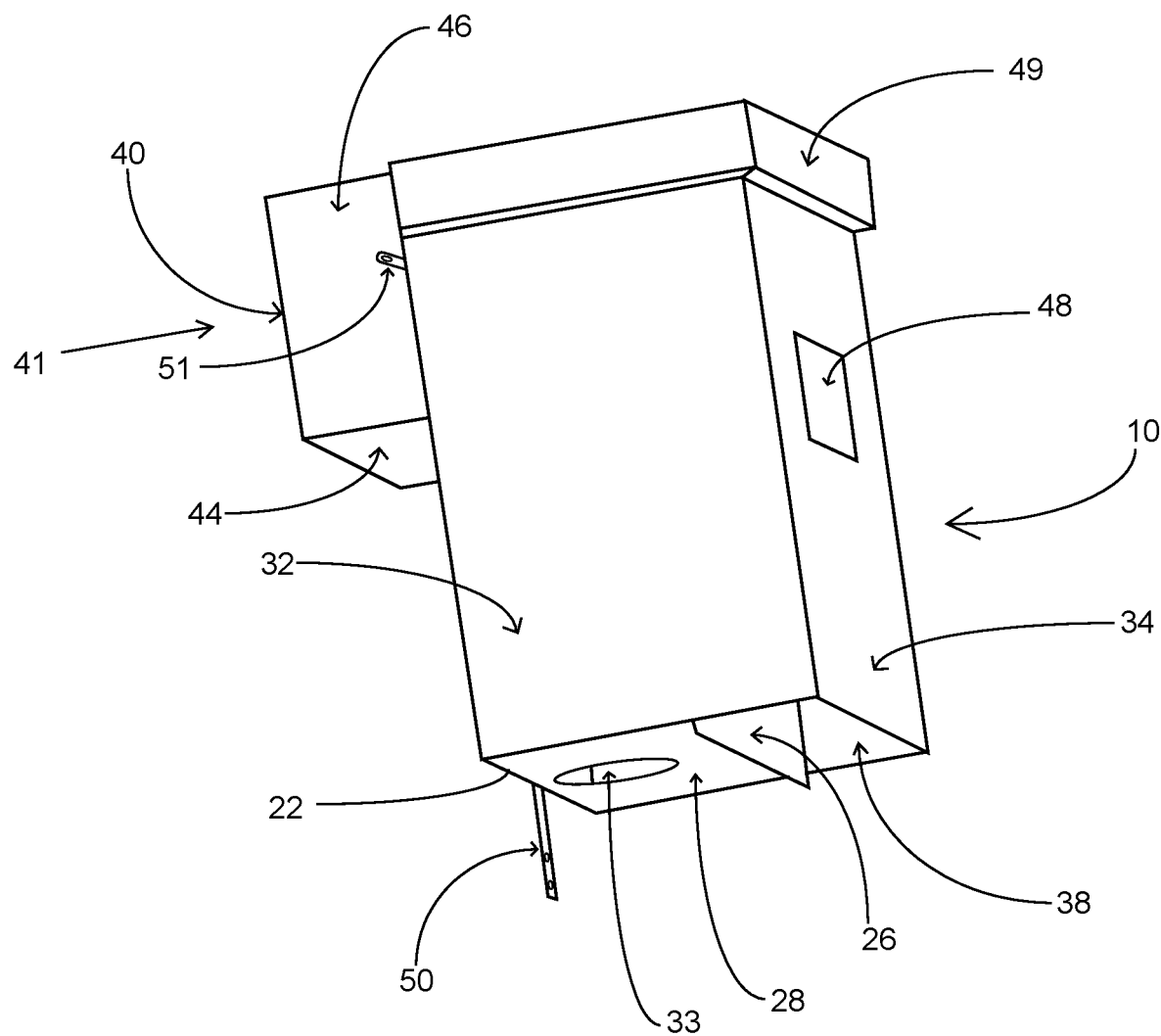
FIG. 6 is an isometric elevation view of the rainhead of FIG. 3.

A moulding 49 may be provided around the upper extent of the external wall 34 and the sidewalk 32 both to lend rigidity, and to improve the aesthetics, of the device 10. To facilitate attachment of the rainhead to the side of the building, an attachment member 50 as shown in FIG. 5 may optionally be provided in addition to the fixing lugs 51.

Figure 7:
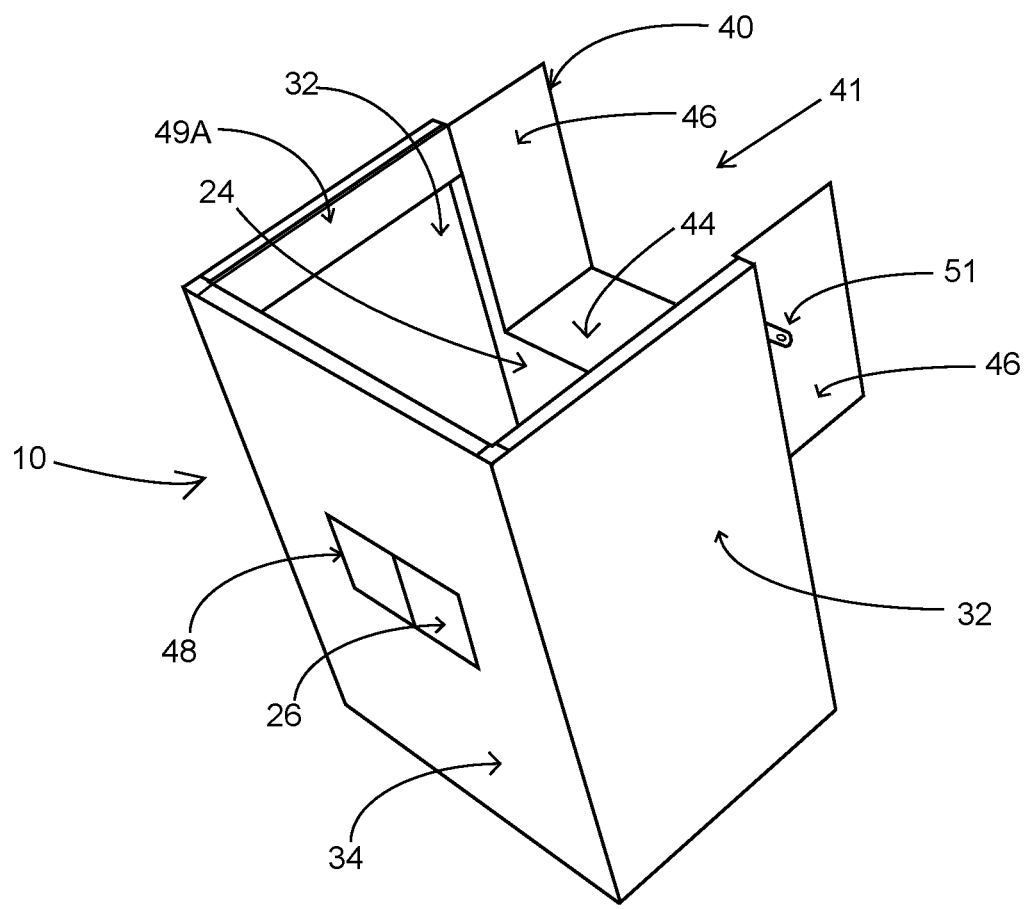
FIGS. 7 and 8 are isometric views of an alternative rainhead construction according to the invention.
Figure 8:
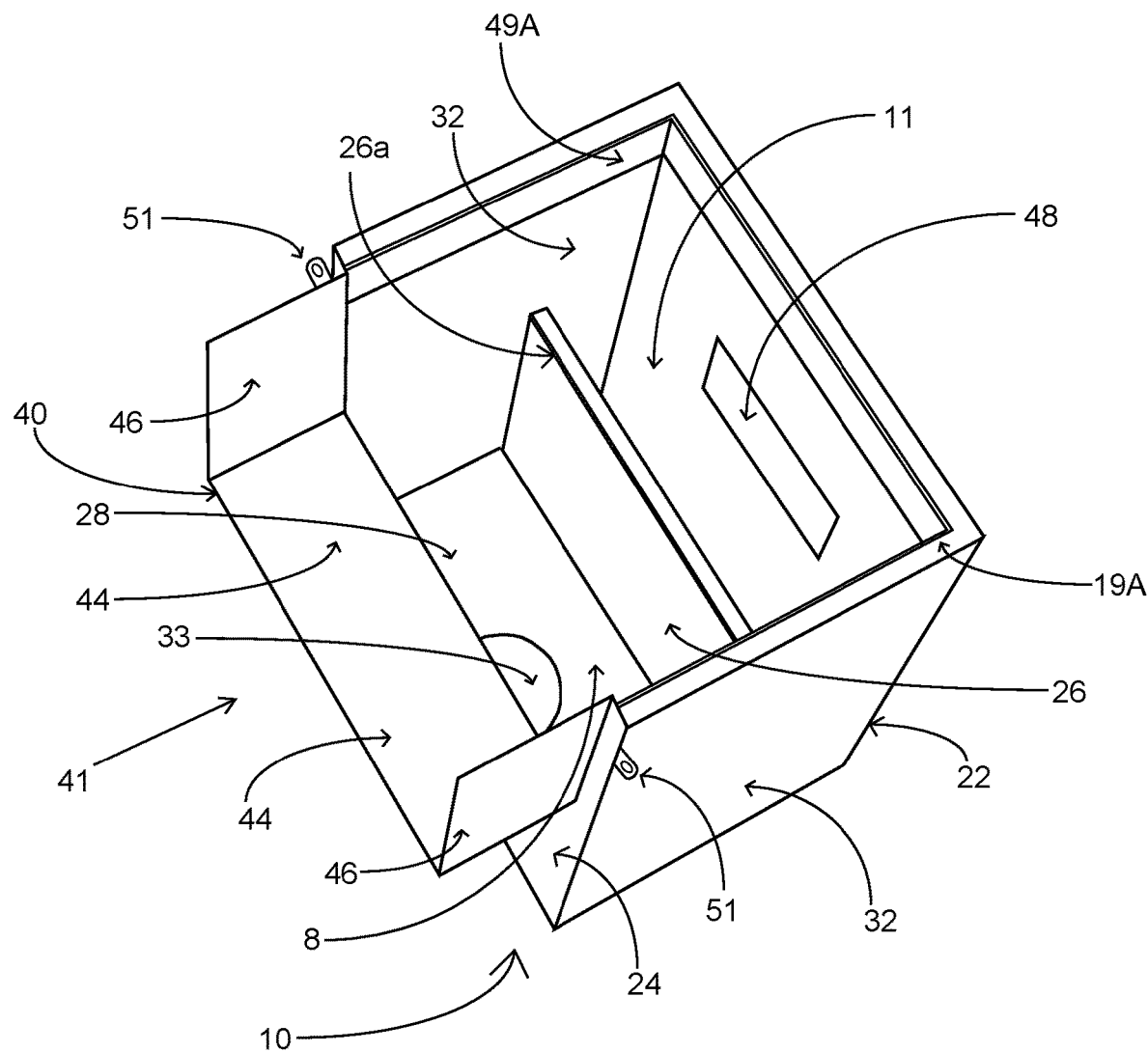

The alternative construction shown in FIGS. 7 and 8 is generally the same as that for FIGS. 3 to 6 with the exception that the moulding 49A is provided internally of the tub 3.

The flow control or overflow device 10 comprising a rainhead may be constructed of any suitable material. It may be of a metal such as steel, stainless steel, COLORBOND or Zincalume protected steel, aluminium or copper. Alternatively, the device 10 can be made of a suitable plastics material. Also, while the illustrated embodiment shows external box-shaped forms of overflow device 10, it is to be appreciated that while it usually is necessary for the mounting wall 24 to be flat, the sidewalls 32 and the external wall 34 may be curved or bent. Indeed, the sidewalls 32 may curve to merge into a curved front or external wall 34. A variety of configurations can be adopted to suit practical needs or aesthetic requirements that do not affect functioning of the overflow device.

The relative dimensions of key features of the overflow devices described with reference to FIGS. 1 to 8 of the drawings will preferably be according to the prescribed 3500.3 rainhead. The dimensions can be chosen to comply with the requirements of the Australasian Standard AS/NZS 3500.3:2015 and subsequent editions, but are not limited to so complying. Those requirements require that the rainhead is physically sealed to the box gutter and has provision to overflow outside the building without restriction in up to a 1-in-a-100 year rain event. The rainhead may be sized to be slightly wider than the box gutter that it is servicing, such as to act as a cover plate around broken edges of masonry or render where the box gutter penetrates the outer wall of the building.

The actual sizes of the rainhead suitable for the particular application and location of use will be determined based on the design flow rate for a given roof catchment area having a design rainfall intensity for a 1-in-a-100 year reoccurrence for a specific location in Australia as defined in AS/NES 3500.3.

Currently AS3500.3 limits the maximum flow rate of all overflow devices to 16 litres per second. The dimensions of an overflow device comprising or including a rainhead desirably are based on both engineering design and aesthetic considerations. The dimensions are not required to be limited to any specific flow rate, and can be designed (by engineering principles and/or physical testing) to accommodate substantially larger flow rates that the maximum of 16 litres per second currently prescribed by 3500.3.

Figure 9:
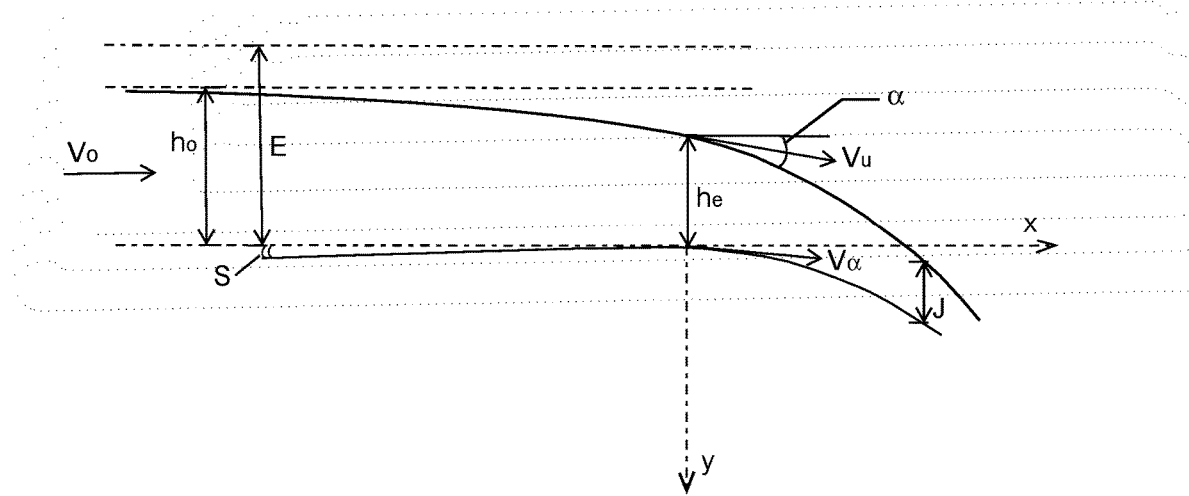
FIG. 9 shows nappe profiles downstream of a box gutter.

The following equations are utilized to compute the nappe profiles downstream of a box gutter, and of the internal wall 26, respectively. Downstream of the Box Gutter (Free Overfall)—See FIG. 9:

$$y = \frac{h_e}{h_0} - \frac{V_{uy}}{V_{ux}}X - \frac{gh_0}{2V_{ux}^2}X^2$$

where $$Y = \frac{y}{h_0}$$

$h_e$ is the brink depth
$V_{uy}$ is the vertical velocity component at the brink
$V_{ux}$ is the horizontal velocity component at the brink $$X = \frac{x}{h0}$$

$h_0$ is the uniform depth in the box gutter
x and y are horizontal and vertical coordinates of the upper nappe respectively.

Figure 10:
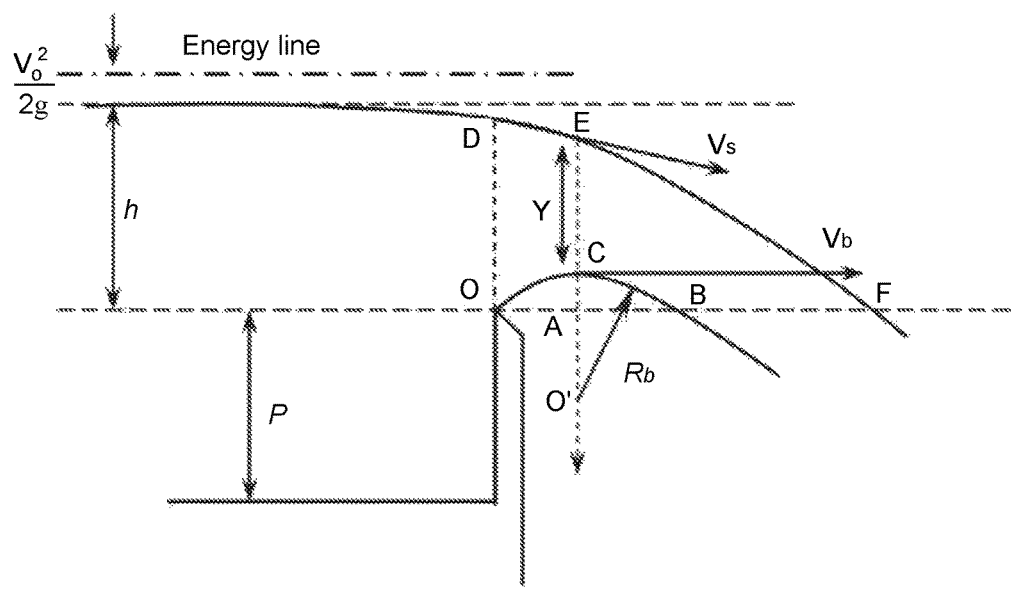
FIG. 10 shows nappe profiles downstream of the internal wall of the rainhead device.

Downstream of the Internal Wall (Sharp-Crested Weir)—See FIG. 10.

$$y = \left(-0.425\left(\frac{x}{H}\right)^2 + 0.055\left(\frac{x}{H}\right) + 0.15 + 0.559\right)H$$

where H is the upstream energy level (equivalent, in this case, to the upstream depth)
x and y are horizontal and vertical coordinates of the upper nappe respectively.

Figure 11:
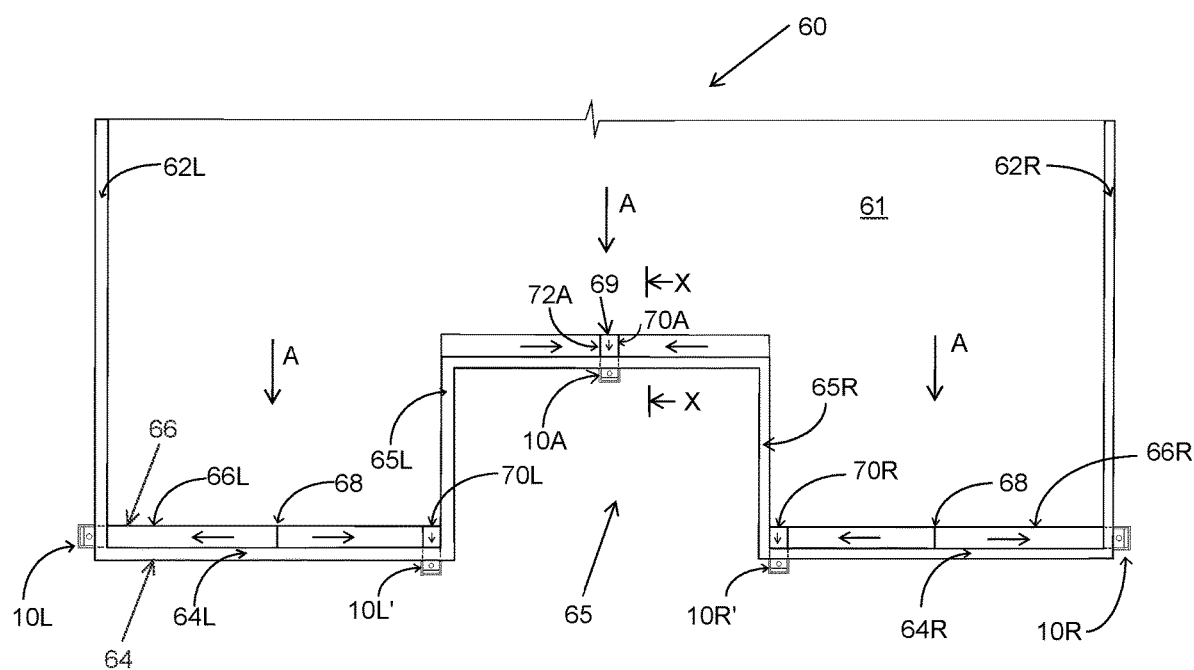
FIG. 11 is a plan view from above of part of the roof of a building illustrating the installation of five overflow devices according to the first aspect of the invention, of which two are installed in the manner described in relation to FIGS. 3 to 6, or FIGS. 7 and 8, with the other three installed in relations to respective forms of respective side outlet devices according to the second aspect of the invention to form respective overflow assemblies according to the third aspect of the invention.
Figure 12:
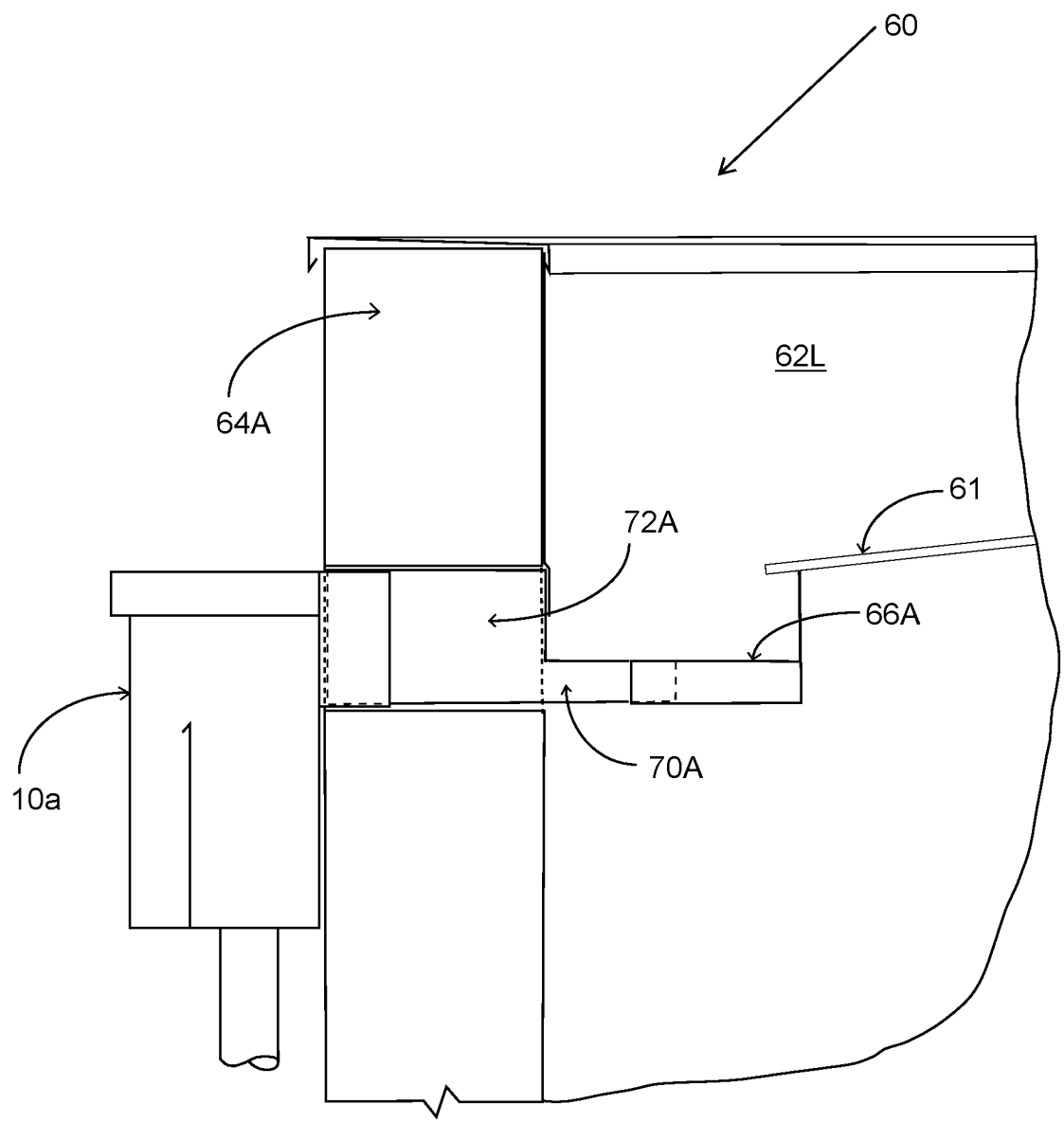
FIG. 12 is a sectional view taken on line X-X of FIG. 11.

Turning now to FIGS. 11 and 12, there is depicted a building 60 of which only roofing 61, opposite left- and right-hand side parapet walls 62L and 62R, and a front parapet wall 64, are shown. A central section 64A of the front wall 64 is set back to form a U-shaped recess 65 between opposite, left and right side sections 64L and 64R of wall 64, with the recess 65 having recess sidewalls 65L and 65R. Each side section 64L and 64R forms a front corner with a respective one of sidewalls 62L and 62R. As seen in FIG. 12, and the arrows "A" in FIG. 11, the direction of the flow of rainwater over the roofing 61 is perpendicular to and towards the sections of the front wall 64. To accommodate drainage of the rainwater, the building has separate box guttering 66 extending along and against each section 64A, 64L and 64R of front wall 64, to provide a central box section 66A and side sections 66L and 66R to the left and right of central section 66A.

The section on line X-X of FIG. 11 is shown in FIG. 12, showing wall section 64A of the building 60, as well as the wall section 62l, in the background, roofing 61 and guttering section 66A. Also shown are the overflow device 10A comprising a rainhead, the side outlet device 70A, while an overflow assembly 72A comprises the combination of devices 10A and 70A.

Each guttering side section 66L and 66R has a highpoint 68 intermediate of its ends from which oppositely extending lengths of box guttering fall along the respective front wall sections 64L and 64R, to their outer ends. The outer-most length of guttering of each side section 66L and 66R has an end that projects into an opening in the respective sidewall 62L and 62R at which it communicates with a respective overflow device 10L and 10R. Each device 10L and 10R is in accordance with the first aspect on the invention and preferably corresponds with a device 10 as described with reference to FIGS. 3 to 6 or FIGS. 7 and 8, and functions in relation to its box gutter length in the manner described for those overflow devices 10. The arrangement is such that water is able to drain from the high point 68 of each side section 66L and 6R so as to drain through the respective one of devices 10L and 10R.

The inner-most length of guttering of each side section 66L and 66R extends from the highpoint 68, along the respective front wall section 64L and 64R, to an end at a corner between its front wall sections 64L and 64R and a respective recess sidewall 65L and 65R. At that corner the innermost length of guttering terminates at a respective side outlet device 70L and 70R that projects into an opening in the respective front wall 64L and 64R. At that opening the outlet device 70L and 70R communicates with a respective overflow device 10L' and 10R'. Each device 10L' and 10R' is in accordance with the first aspect on the invention and preferably corresponds with a device 10 as described with reference to FIGS. 3 to 6 or FIGS. 7 and 8, and functions in relation to its side outlet device in essentially the manner described for functioning of each of those overflow devices 10 relative to its box gutter. Each side outlet device 70L and 70R is in accordance with the third aspect on the invention and preferably corresponds with a device later described herein with reference to the drawings. The arrangement is such that water is able to drain from the high point 68 of each side section 66L and 66R so as to drain through the respective one of devices 10L' and 10R'. As will be appreciated, water flowing to device 70L approaches from the left as viewed from in front of the building, while water flowing to device 70R approached from the right. As a consequence, device 70L is of opposite hand to device 70R, such as due the devices 70L and 70R being mirror opposites.

The guttering central section 66A has a low-point 69 intermediate of its ends to which each of oppositely extending lengths of box guttering falls from its outer end. The arrangement is such that water is able to drain to the low point 69 from each end of central section 66A so as to drain through a side outlet device 70A according to the third aspect of the invention, and then to discharge through an overflow device 10A according to the first aspect of the invention. The side outlet device 70A preferably corresponds with a device as later described herein with reference to the drawings and, as can be appreciated, it is can simultaneously receive water flowing from the left and right as the device 70A is viewed from in front of the building. The device 10A preferably corresponds with a device 10 as described with reference to FIGS. 3 to 6 or FIGS. 7 and 8, and functions in relation to the side outlet device 70A in essentially the same manner as described for the functioning of those overflow devices 10 relative to their box gutter section.

Figure 13:
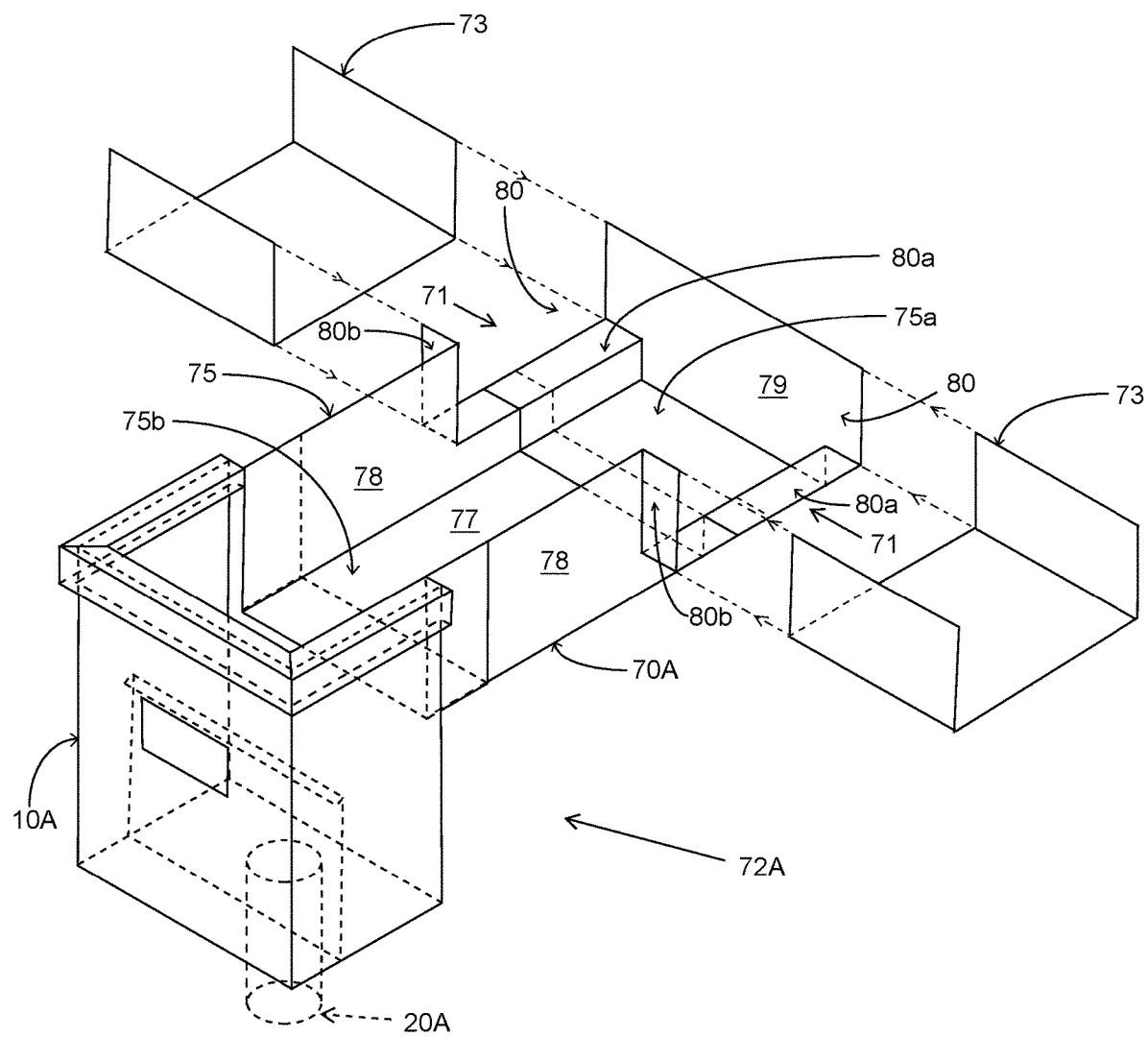
FIG. 13 is a partially exploded perspective view of a first form of overflow assembly shown in FIG. 11, as in the course of installation in relation to guttering.

FIGS. 13 and 14 provide similar perspective views of overflow device 10A according to the first aspect of the invention shown in combination with a first form of a side outlet device 70A according to the second aspect of the invention, to form a first form of an overflow assembly 72A according to the third aspect of the invention. FIG. 15 provides a perspective view of the overflow device 10A apart from other components, while the side outlet device 70A is shown in FIGS. 13 and 14, while a perspective view of a respective component of the side outlet device 70A is shown in each of FIGS. 16 and 17. As evident from FIGS. 11 and 12, the overflow assembly 72A of FIGS. 13 to 17 is suitable for use at a location such as shown at low-point 69 of guttering central section 66A of FIGS. 11 and 12. As depicted in FIG. 13, assembly 72A is intermediate of end sections 73 of oppositely extending lengths of box guttering installed along the inner face of the central wall section 64A of the external parapet wall 64, such that water is able to drain along each length of box guttering to the low-point 69, where the water is received into the side outlet device 70A and then to pass through an opening 74 through the wall section 64A, into overflow device 10A to discharge under gravity via downpipe 20A. The device 10A preferably corresponds with a device 10 as described with reference to FIGS. 3 to 6 or FIGS. 7 and 8, and functions in relation to the side outlet device 70A in essentially the same manner as described for the functioning of those overflow devices 10 relative to their box gutter section.

The side outlet device 70A may be of unitary construction formed as if from a single piece of appropriate sheet material, such as steel or other material detailed above. Alternatively, the device may be formed of an inlet section Y shown in FIG. 17 and an outlet section Z shown in FIG. 16. As formed or assembled, the side outlet device has an open-topped, channel-shaped body 75 that extends between an inlet end 75a and an outlet end 75b and is defined by a horizontally disposed base 77 and upstanding sidewalls 78. At the inlet end 75a of the body 75 the device 70A has an end wall 79 that is upstanding from the base 77 and joins the sidewalls 78. Over a distance from the end wall 79, a part of the length of each sidewall 78 has a reduced height above the base 77 to form a rectangular opening 80 that is bordered by the end wall 76, horizontally extending flange 80a and an upright flange 80b, with the flanges 80a and 80b of each sidewall 78 projecting outwardly away from the other sidewall 78. The arrangement is such that each opening 80, the end wall 79 and the flanges 80a and 80b together define an inlet 81 that is adapted to receive the end of a respective box gutter section 73 to enable water flowing from each gutter section 73 to discharge into side outlet device 70A and to flow therein from the inlet end 75a to outlet end 75b. From the outlet end 75b, the water is able to flow into the overflow device 10A and then to discharge via downpipe 20A. To enable this, the body has a cross-section at the outlet that has substantially the form and dimensions of a box gutter for which the overflow device 10A is designed to cooperate when used in the manner described with reference to FIGS. 3 to 6 or FIGS. 7 and 8. Thus, the outlet end 75b of the body 75 of the side outlet device 70A can be received into the opening 74 through the parapet wall section 64A and, within the opening 74, the outlet end 75b of device 70A can be received and engaged in the receptor 40A of device 10A, so that water is able to flow from device 70A to device 10A. As will be appreciated, the flow through device 70A to device 10A is able to be received from both the left and right hand side of device 70A, via respective box gutter sections 73.

The base of the side outlet device 77 is set lower than the base (or 'sole') of box gutters 73 to an extent that relates to the hydraulic operation of the device 77. AS3500.3 does not permit box gutters to change direction. However, the lower base of the side outlet device 77 creates a 'knickpoint' within the water flow, whereby free overran occurs from gutters 73 into the side outlet device 77, allowing the side outlet device 77 to be considered as separate, deeper box gutter with water then flowing from the inlet end to the outlet end of the device 77, and then into the downpipe via the overflow device comprising or including a rainhead, as previously described.

FIG. 18 and FIGS. 19, 20, 21 and 22 are similar to FIGS. 13 to 17, but show the overflow device 10L' in combination with a second form of the side outlet device 70L to form a second form of overflow assembly 72L. The device 70L is suitable for use as the device 70L in the arrangement of FIGS. 11 and 12. In each case components of the overflow device 10A or 10L' of FIGS. 13 to 22 correspond to components of the device 10 of FIGS. 3 to 6 and have the same reference numeral, such that duplication of description is not necessary. Rather it is sufficient to limit description to matters of difference between devices 70A and 70L and, hence, between overflow assemblies 72A and 72L. In the device 70L, only one sidewall 78 has a reduced height above the base 77 to form a rectangular opening 80 that is bordered by the end wall 76, horizontally extending flange 80a and an upright flange 80b, with the flanges 80a and 80b of the one sidewall 78 projecting outwardly away from the other sidewall 78. As viewed from in front of the building of FIG. 11, the one sidewall 78 with reduced height is the left hand sidewall 78. The arrangement is such that the one opening 80, the end wall 79 and the flanges 80a and 80b together define a single inlet 81 that is adapted to receive the end of the inner-most length of guttering of side section 66L to enable water flowing from the high point of that guttering to discharge into side outlet device 70L and to flow therein from the inlet end 75a to outlet end 75b. From the outlet end 75b, the water is able to flow into the overflow device 10L' and then to discharge via a downpipe for device 10L'.

As will be appreciated, the device 70R shown in FIG. 11 can be the mirror image of the device 70L and, as a consequence, it need not be separately illustrated. Again, in the device 70R, only one sidewall has a reduced height above the base to form a rectangular opening that is bordered by the end wall, a horizontally extending flange and an upright flange, with the flanges of the one sidewall, the right sidewall in device 70R, projecting outwardly away from the other or left sidewall. Again the arrangement is such that the one opening, the end wall and the flanges together define a single inlet that is adapted to receive the end of the inner-most length of guttering of side section 66R to enable water flowing from the high point of that guttering to discharge into side outlet device 70R and to flow therein from the inlet end to outlet end, and from the outlet end, the water is able to flow into the overflow device 10R' and then to discharge via a downpipe for device 10R'.

Figure 18:
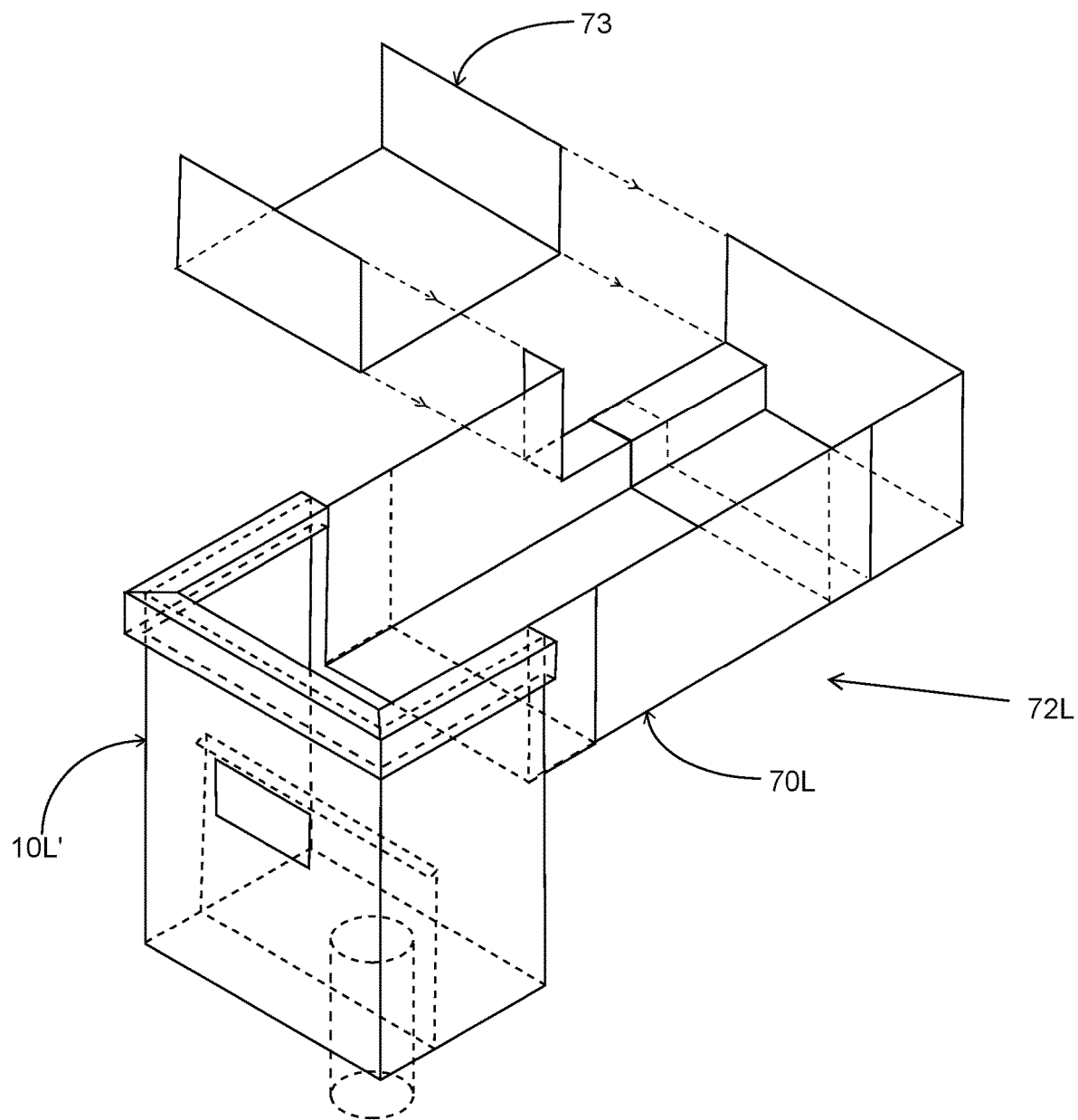
FIG. 18 is a perspective view of a second form of overflow assembly shown in FIG. 11, as in the course of installation in relation to guttering.

As indicated, the side outlet devices can be of a unitary from, rather than made with two components as in FIGS. 13 and 18. However the two-component form is preferable for installing a side outlet through parapet wall (the most common scenario), whereas a single piece or unitary side outlet device would be difficult (although not impossible) to install. However, a single component side outlet could be utilised in for example a new build situation. A secondary benefit with a two-component form is that it can be expanded to fit various box gutter sizes using a single device (as long as the flow rate does not exceed the maximum capacity of the overflow device comprising a rainhead being utilised. In summary, it is generally easier to install the side outlet device as two components, particularly as box gutter sizes can vary quite considerably. In the case of a retrofit where lifting the box gutter is not possible, the side outlet can also be installed overlapping the box gutter or box gutter section, rather than being underneath them. Furthermore, a two-component side outlet device can be manufactured in one size, which adapts to different box gutter widths, whereas a one component side outlet would need to be manufactured in a number of different sizes, to suit different standard box gutter widths. Consequently, the two-component side outlet has benefits relating to the manufacture and stocking of one size only.

Turning now to FIG. 23, there is depicted a corner of a building 160 of which only two mutually inclined roofing sections 161a and 161b are shown in relation to adjacent side and front parapet wall sections 162S and 162F that together form the corner of the building. Roofing section 161a is inclined down towards wall section 162S, while section roofing section 161b is similarly inclined down towards wall section 162F. The arrows "B" in FIG. 23 show the direction of the flow of rainwater over each roofing section 161a and 161b is away from a ridge R between the roofing sections 161a and 161b, and perpendicular to and towards the respective one of wall sections 162S and 162F. To accommodate drainage of the rainwater, the building 160 has separate box guttering 166S and 166F extending along and against the inner face of wall section 162S and 162F, respectively. Each guttering 166S and 166F has a fall towards the corner defined between wall sections 162S and 162F and, to enable drainage of water, an overflow assembly 172, shown in detail in FIG. 24, is installed.

As can be appreciated from FIG. 24, the form shown for the overflow assembly 172 is similar in most respects to the illustration in FIGS. 18 and 19 of an overflow device 10L' comprising or including a rainhead in combination with a second form of the side outlet device 170 to form a form of overflow assembly 172. Accordingly, a substantial understanding of the assembly 172 can be gained from the description of FIGS. 18 to 22. Also, in a similar manner to device 70L being of opposite hand to device 70R, such as due the devices 70L and 70R being mirror opposites, it will be appreciated that the side outlet device 170 can be in a form that is the mirror image opposite of that shown. As with previously described side outlet devices, the device 170 has a rectangular opening 180 formed in one sidewall 178, to enable engagement with an end of a laterally received box gutter section 173. However, it additionally has a rectangular opening 180' formed in the end wall 179 to enable engagement with an end of a box gutter section 173' received at the inlet end 175a at right angles to the gutter section 173. The arrangement could be such that the opening is bordered by outwardly extending flanges corresponding to the previously described flanges such as 80a and 80b. However, the illustrated arrangement utilises a U-shaped bracket 190 that is sized to be a neat fit in the opening 180' and to receive the end of the gutter section 173'. The web 191 and one arm 192 of bracket 190 has mutually perpendicular flanges 191a, 191b and 192a, 192b, respectively, while the other arm 193 of bracket 190 has oppositely extending fore and aft flanges 193a, 193b. The overall arrangement of bracket 190 is such that sealing engagement is enabled with both the end 175a of device 170 and the received end of gutter section 173'.

Figure 25:
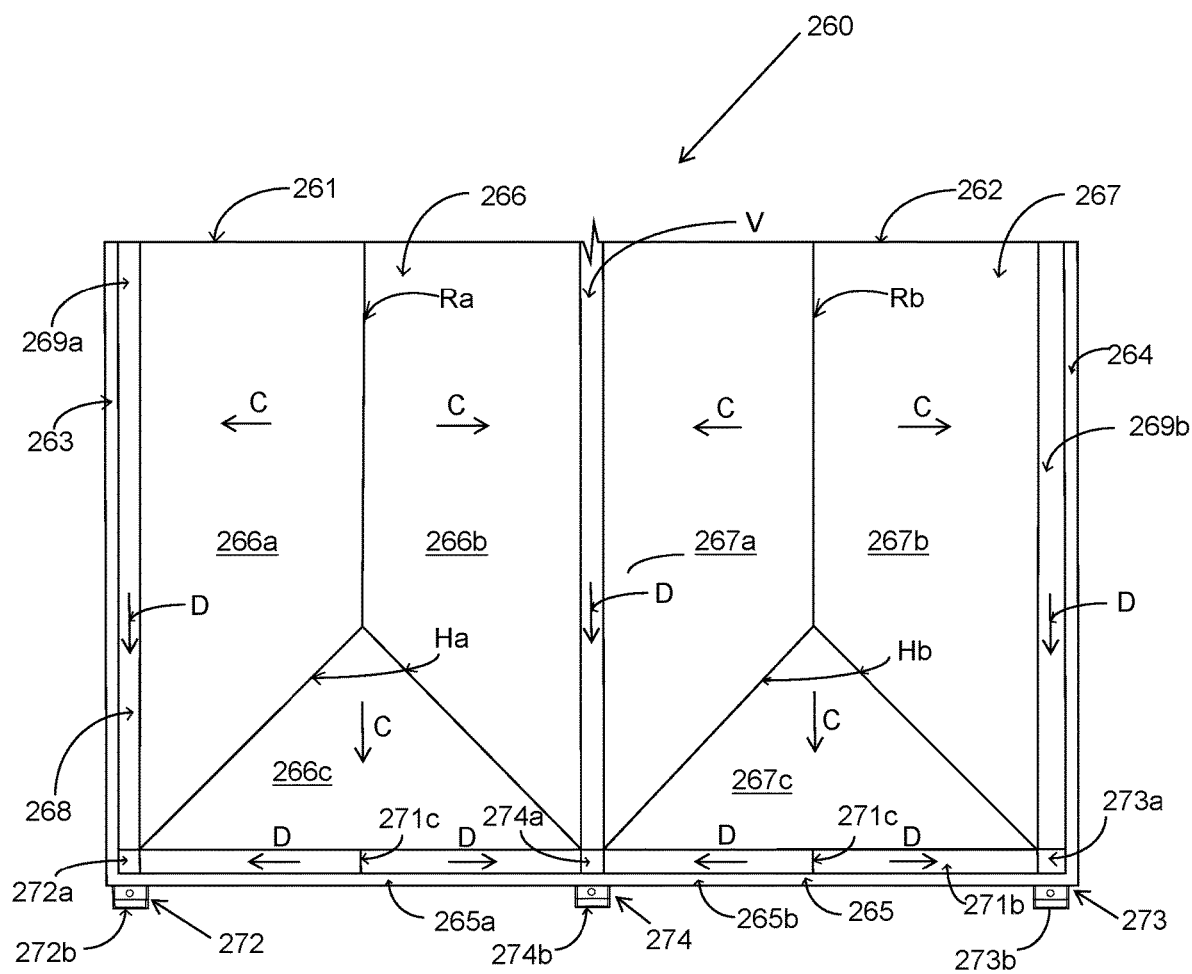
FIG. 25 is a plan view from above of part of the roof of yet another building illustrating the installation of an overflow device according to the first aspect of the invention in relation to a fifth side outlet device according to the second aspect of the invention to form yet a further overflow assembly according to the second aspect of the invention.

FIG. 25 depicts a front section of a building structure 260 having left and right hand building parts 261 and 262, each with a front to rear external side parapet wall 263 and 264 and a common front parapet wall 265 of which left and right hand parts 265a and 265b form parts of building parts 261 and 262, respectively. The building parts 261 and 262 may define a common internal space (not visible), or they may be at least partially internally separated from each other by a front to rear extending partition wall (not shown). The arrangement of structure 260 may be that of a pair of townhouses arranged side-by-side in a row and separated by a front to rear partition wall comprising a common wall or a double wall, while there may be more than two building parts in the row. Each part 261 and 262 has roofing 266 and 267, each defining a front-to-rear roof ridge Ra and Rb and diagonal hips Ha and Hb. FIG. 25 illustrates a good example of usage of the fourth and fifth forms of the second aspect of the invention and, while there are numerous other applications for both of these forms, the arrangement of FIG. 25 shows each of roofing 266, 267 has:

(i) an outer side section 266a and 267a that slopes down from the respective roof ridge Ra, Rb to the respective side parapet wall 263, 264;

(ii) an inner side section 266b, 267b that slopes down from the respective roof ridge Ra, Rb to define a front to rear valley "V" between the building parts 261, 262; and (iii) a triangular front section (or roof 'hip end') 266c, 267c that has an apex at the forward end of the respective roof ridge Ra, Rb and slopes down from hips Ha and hb to the front parapet wall 265.

Each roofing 266 and 267 is such that that the flow of water during a period of rainfall is as illustrated by arrows "C". Thus, rainwater flows down the respective sections of roofing 266, 267 towards the side parapet walls 263, 264; into the valley V; and towards each part 265a, 265b of the front parapet wall 265. Accordingly, the building structure 260 is provided with a box guttering system 268 having a respective box gutter section 269a and 269b along each of side parapet walls 263 and 264; a further respective box gutter section 271a and 271b along each part 265a and 265b of the front parapet wall 265; and a central front to rear extending box gutter 270 extending along the valley V. Each of gutter sections 269 and 270 has a fall towards a corner between the side wall 263 and 264 and a respective end of the front parapet wall 265. Similarly the box gutter section 270 has a fall to the forward end adjacent to the front parapet wall 265 Each gutter section 271a and 271b has a highpoint 271c intermediate of its ends from which oppositely extending lengths of box guttering fall along the respective front wall part 265a and 265b. This arrangement is such that an outer one of the lengths of each section 271a and 271b falls from highpoint 271c to, and terminates at, a respective overflow assembly 272, 273 at each corner between the respective front wall part 265a and 265b and the respective side wall 263 and 264, while the inner one of the lengths of each section 271a and 271b falls from the highpoint 271c to, and terminates at, a respective side of a further overflow assembly 274; and gutter section 270 terminates at an inner end of assembly 274.

Each of the overflow assemblies 272, 273 and 274 comprises an assembly of a respective side outlet device 272a, 273a and 274a according to the present invention with an overflow device 272b, 273b and 274b comprising a rainhead. The arrangement is such that the side outlet device of each assembly enables water to able to pass through the parapet walls 263, 264 and 265, from the respective box gutter section, or sections and hence from within the parapet walls 263, 264 and 265, to discharge through a respective downpipe connected to each rainhead. Each rainhead 272b, 273b and 274b is mounted exteriorly of the building structure 260 and is as detailed above with reference to the rainhead of FIGS. 3 to 6 or FIGS. 7 and 8. As detailed above, and described later herein with reference to FIG. 26 for assembly 274, the respective devices 272a and 272b; 273a and 273b; and 274a and 274b comprising the assemblies 272, 273 and 274 are inter-connected through openings through the front parapet wall 265, with each device 273b, 274b and 275b comprising a rainhead mounted against the outer face of wall 265. However, the assembly comprising devices 272*a* and 272*b* corresponds to the assembly 172 of FIG. 24, while the assembly comprising devices 273*a* and 273*b* is the mirror image opposite, or a version of opposite hand, of assembly 172 of FIG. 24. Accordingly the detail of those assemblies will be understood readily from the description relating to FIG. 16. The arrangement is such the respective assembly of the devices 272*a*, 272*b* on the one hand and 273*a*, 2734*b* on the other hand could be reversed and installed so that each inter-connection is through one of the side parapet walls 261, 262 with the rainhead mounted against the outer face of the respective one of walls 261, 262. The flow along the box gutter sections for discharge from each roofing 266, 267 is depicted in each case by a respective arrow "D".

Figure 26:
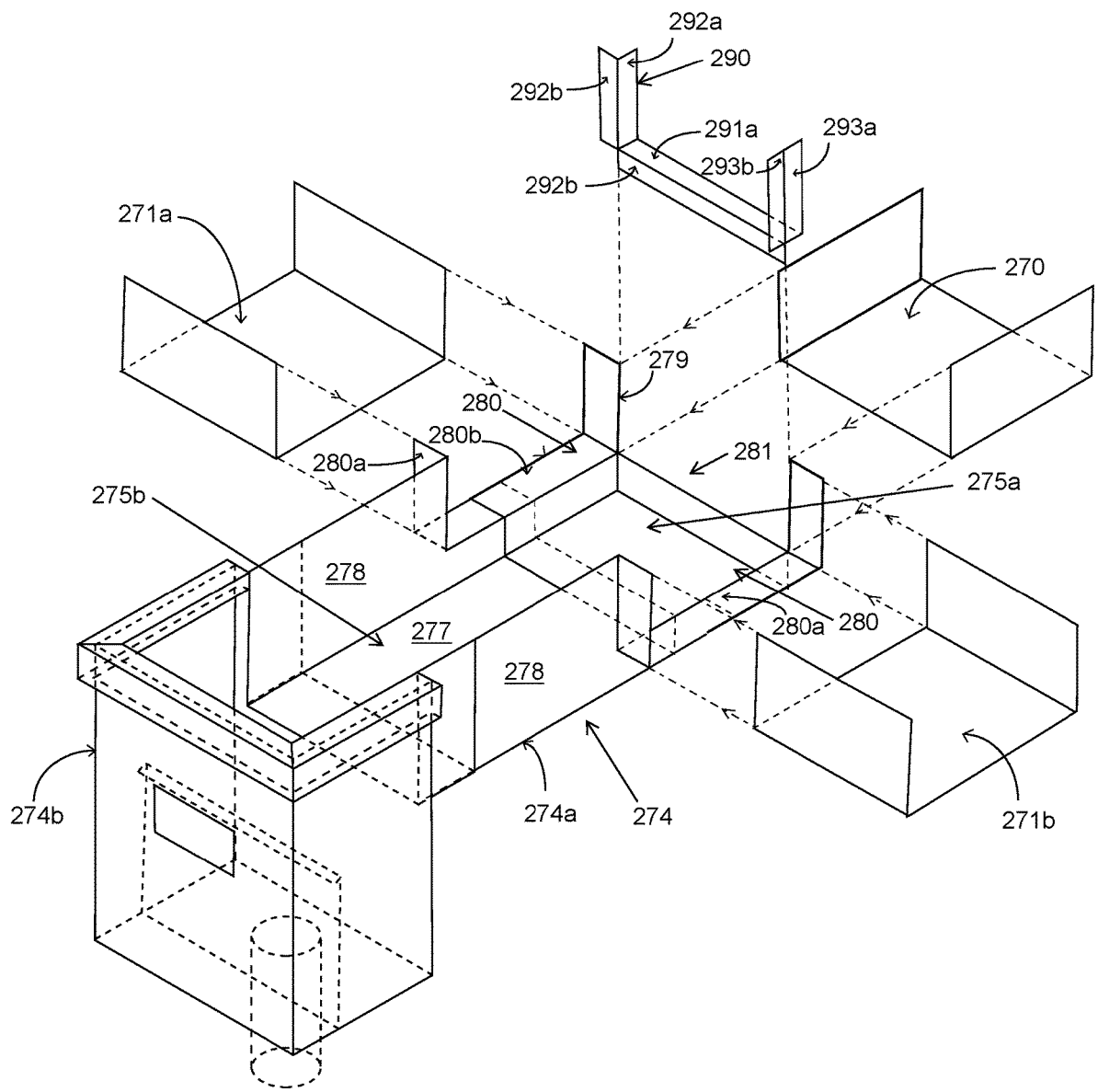
FIG. 26 is an exploded perspective view of the fifth side outlet device according to the second aspect on the invention forming part of the arrangement of FIG. 25.

FIG. 26 shows a perspective view of the assembly 274 comprising the side outlet device 274*a* and the rainhead 274*b* of the building 260 of FIG. 25. As indicated, the rainhead 274*b* preferably corresponds to the rainhead described with reference to FIGS. 3 to 6 or FIGS. 7 and 8. Also, the side outlet device 274*a* readily will be understood from consideration of the combined drainage requirements for roofing 266 and roofing 267 and description of the side outlet devices previously shown in FIGS. 13 and 24. As in the arrangement of side outlet device 70A of FIG. 13, the side outlet device 274*a* has opposed sidewalls 278, each provided with a respective part of reduced height above the base 277 to form a rectangular opening 280 that is bordered by the end wall 279 to form a rectangular opening 280. As in FIG. 13, the arrangement is such that each opening 280, the end wall 279 and the flanges 280*a* and 280*b* together define an inlet that is adapted to receive the end of a respective inner one of the lengths of each box gutter section 271*a* and 271*b* to enable water flowing from each of those gutter inner section 271*a* and 271*b* to discharge into side outlet device 274*a* and to flow therein from the inlet end 275*a* to outlet end 275*b* and through the rainhead 274*b*. However, as in the manner of side outlet device 170 of FIG. 24, the side outlet device 274*a* additionally has a rectangular opening 281 formed in the end wall 279 to enable engagement with an end of the box gutter section 270 received at the opening 281 at right angles to the gutter box gutter sections 271*a* and 271*b*. The illustrated arrangement utilises a U-shaped bracket 290 that is sized to be a neat fit in the opening 280 and to receive the end of the gutter section 270. The web and one arm of bracket 290 has mutually perpendicular flanges 291*a*, 291*b* and 292*a*, 292*b*, respectively, while the other arm 293 of bracket 290 has oppositely extending fore and aft flanges 293*a*, 293*b*. The overall arrangement of bracket 290 is such that sealing engagement is enabled with both the end 275*a* of device 274*b* and the received end of gutter section 270.

As will be appreciated, sealing engagement is required between interconnected components and devices, and between devices and box gutter sections, in accordance with established good practice. Thus, joints at interconnections preferably are riveted, such as at no less than 40 mm intervals in a staggered pattern. During assembly (and prior to the riveting) roof and gutter silicone should be applied between the jointed surfaces and compressed together using the rivets. Any excess silicone should then be wiped off and all rivets should be sealed up with silicone.

While the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The overflow device according to the invention that comprises or includes a rainhead has one or more features to facilitate overflow of water outside of a building even if a section of the rainhead becomes blocked. It also provides compliant overflow while maintaining a traditional rainhead aesthetic by means of the external wall of the rainhead able to shield against a direct line of sight into the end of the box gutter without impairing the ability of the rainhead to discharge overflow water if the rainhead outlet becomes blocked or if the flow of water is beyond the design capacity of the stormwater drainage system.

The invention claimed is:

1. A side outlet device, suitable for use in an overflow assembly including a combination of the side outlet device and a rainhead, the overflow assembly mountable, in relation to a roof area, adjacent to an outer a wall of a building, the side outlet device to be in communication with the rainhead, the rainhead to be mounted on an external side of the wall opposite box guttering extending along an interior side of the wall, whereby water flowing from the roof area and along the box guttering is able to pass, in turn, through the side outlet device and the overflow device to a downpipe of the building, the side outlet device comprising:

an elongate body extending between first and second opposite ends of the body, the body formed by at least two sections adapted for sealable longitudinal interfitting, the at least two sections including a first end section at the first end of the body and a second end section at the second end of the body, the body including:

a first side wall extending along a first side of the body;

a second side wall extending along a second side of the body opposite the first side; and a base wall extending between the first and second side walls, the first side wall, the second side wall, and the base wall defining an open-topped channel extending between the first and second end sections, the open-topped channel having a U-shaped cross-section;

the first end section having a form of a box gutter end section adapted for communication with the rainhead;

the second end section including:

a lateral wall extending across the channel transverse to the first and second side walls; and a U-shaped lateral inlet defined in at least one of the first side wall or the second side wall, the inlet having a lower edge spaced apart from the base wall of the body; and a flange adjacent a peripheral edge of the inlet to facilitate lateral connection of the inlet to an end outlet of the box guttering to enable water to flow from the box guttering laterally into the channel and then flow longitudinally from the second section of the body to and through the first section of the body, and into the rainhead.

2. A side outlet device according to claim 1, wherein the inlet is a first inlet defined in the first side wall, the flange is a first flange, the second end section includes a second U-shaped lateral inlet in the second wall, the second inlet having a lower edge spaced apart from the base wall, and the side outlet device further includes a second flange adjacent a peripheral edge of the second inlet to facilitate lateral connection of the second inlet to a second end outlet of the box guttering.

3. A side outlet device according to claim 2, wherein the inlet is a first inlet, the flange is a first flange, the lateral wall defines a third U-shaped inlet having a lower edge spaced apart from the base wall, and the side outlet device further includes a third flange adjacent a peripheral edge of the third inlet to facilitate longitudinal connection of the third inlet to a third end outlet of the box guttering.

4. A side outlet device according to claim 1, wherein the inlet is a first inlet, the flange is a first flange, the lateral wall defines a second U-shaped inlet having a lower edge spaced apart from the base wall, and the side outlet device further includes a second flange adjacent a peripheral edge of the second inlet to facilitate longitudinal connection of the second inlet to a second end outlet of the box guttering.

5. A side outlet device according to claim 1, wherein the at least one of the first side wall or the second side wall extends between the base wall and the lower edge of the inlet.

6. An overflow assembly including:
an overflow device including a rainhead; and
the side outlet device of claim 1.

7. The overflow assembly of claim 6, where the overflow device is the rainhead, the rainhead including:
a tub member having an inlet at an upper extent of the tub member;
an internal receptacle in the tub member; and
a chute provided in the tub member, the tub member further including:
a lower extent at which the tub member defines both a bottom wall at which the receptacle is adapted or adaptable to be connected to a downpipe and a chute outlet;
a side at which the receptacle is adapted to be installed in relation to an external wall of a building, between an end of a box gutter section of guttering and an upper end of a downpipe of the building, whereby water from the box guttering is able to flow into the receptacle through the inlet and discharge through the bottom wall to the downpipe; and
a wall that is common to the receptacle and the chute whereby, in the event of a blockage restricting the discharge of water through the bottom wall, water is able to rise in the receptacle to overflow an upper edge of the common wall and to discharge substantially vertically in the chute and to drain through the chute outlet.

8. A side outlet device, suitable for use in an overflow assembly including a combination of the side outlet device and a rainhead, the overflow assembly mountable, in relation to a roof area, adjacent to an outer a wall of a building, the side outlet device to be in communication with the rainhead, the rainhead to be mounted on an external side of the wall opposite box guttering extending along an interior side of the wall, the side outlet device comprising:
an elongate body extending between first and second opposite ends of the body, the body formed by at least two sections adapted for sealable longitudinal interfitting, the at least two sections including a first end section at the first end of the body and a second end section at the second end of the body, the body including:
a first side wall extending along a first side of the body;
a second side wall extending along a second side of the body opposite the first side; and
a base wall extending between the first and second side walls, the first side wall, the second side wall, and the base wall defining an open-topped channel extending between the first and second end sections;
the first end section having a form of a box gutter end section adapted for communication with the rainhead;
the second end section including:
a lateral wall extending across the channel transverse to the first and second side walls; and
a U-shaped lateral inlet defined in at least one of the first side wall or the second side wall, the inlet having a lower edge spaced apart from the base wall of the body; and
a flange adjacent a peripheral edge of the inlet to facilitate lateral connection of the inlet to an end outlet of the box guttering, the base wall to be lower than the flange and lower than a sole of the end outlet of the box guttering to facilitate hydraulic operation of the side outlet device by creating a knickpoint for water flowing laterally into the channel from the box guttering, the water to then flow longitudinally from the second end, to and through the first end of the body and into the rainhead.

\* \* \* \* \*